(12) United States Patent
Broeng et al.

(10) Patent No.: US 8,600,207 B2
(45) Date of Patent: Dec. 3, 2013

(54) SPLICING AND CONNECTORIZATION OF PHOTONIC CRYSTAL FIBRES

(75) Inventors: Jes Broeng, Birkerod (DK); Rene Engel Kristiansen, Vaerlose (DK)

(73) Assignee: NKT Photonics A/S, Birkerod (DK)

( * ) Notice: Subject to any disclaimer, the term of this patent is extended or adjusted under 35 U.S.C. 154(b) by 0 days.

(21) Appl. No.: 13/437,280

(22) Filed: Apr. 2, 2012

(65) Prior Publication Data

US 2012/0251059 A1   Oct. 4, 2012

Related U.S. Application Data

(62) Division of application No. 11/641,663, filed on Dec. 20, 2006, now abandoned, which is a division of application No. 10/535,628, filed as application No. PCT/DK03/00804 on Nov. 27, 2003, now abandoned.

(30) Foreign Application Priority Data

Nov. 23, 2002 (DK) .................................. 2002 01812

(51) Int. Cl.
*G02B 6/02* (2006.01)

(52) U.S. Cl.
USPC ........... 385/125; 385/122; 385/124; 385/126; 385/127; 385/128

(58) Field of Classification Search
USPC ....................................................... 385/125
See application file for complete search history.

(56) References Cited

U.S. PATENT DOCUMENTS

| | | | |
|---|---|---|---|
| 5,802,236 A | 9/1998 | DiGiovanni et al. | |
| 6,089,044 A * | 7/2000 | Hardy et al. | 65/408 |
| 6,334,017 B1 | 12/2001 | West | |
| 6,418,258 B1 | 7/2002 | Wang | |
| 6,539,155 B1 | 3/2003 | Broeng et al. | |

(Continued)

FOREIGN PATENT DOCUMENTS

| | | |
|---|---|---|
| EP | 1 199 582 B1 | 4/2002 |
| JP | 2002-148468 | 5/2002 |
| WO | 00/49435 | 8/2000 |
| WO | 02/084350 A1 | 10/2002 |

OTHER PUBLICATIONS

Furusawa, K. et al., "Cladding pumped Ytterbium-doped fiber laser with holey inner and outer cladding", Optics Express, vol. 9, No. 13, 2001, pp. 714-720.

(Continued)

*Primary Examiner* — Ryan Lepisto
(74) *Attorney, Agent, or Firm* — Buchanan Ingersoll & Rooney PC

(57) ABSTRACT

A method of coupling a spliceable optical fiber includes (A) providing the spliceable optical fiber, the spliceable optical fiber including (a) a core region; and (b) a microstructured cladding region. The cladding region surrounds the core region and includes (b1) an inner cladding region having a refractive index formed by inner cladding features arranged in an inner cladding background material with a refractive index n1, the inner cladding features including thermally collapsible holes or voids, and (b2) an outer cladding region with an outer cladding background material with a refractive index n2, the spliceable optical fiber having at least one end. (B) Collapsing the thermally collapsible holes or voids by heating the at least one end of the spliceable optical fiber thereby increasing the refractive index of the inner cladding providing an expanded core. And, (C) coupling the collapsed spliceable optical fiber end to the optical component.

25 Claims, 19 Drawing Sheets

(56) References Cited

U.S. PATENT DOCUMENTS

| | | |
|---|---|---|
| 6,571,045 B2 | 5/2003 | Hasegawa et al. |
| 6,577,801 B2 | 6/2003 | Broderick et al. |
| 6,652,163 B2 | 11/2003 | Fajardo et al. |
| 6,738,550 B2 | 5/2004 | Town |
| 6,845,204 B1 | 1/2005 | Broeng et al. |
| 6,856,742 B2 | 2/2005 | Broeng et al. |
| 6,859,598 B2 | 2/2005 | Hasegawa et al. |
| 6,972,894 B2 | 12/2005 | Bjarklev et al. |
| 2001/0024557 A1 | 9/2001 | Hasegawa et al. |
| 2002/0024557 A1 | 2/2002 | Matsumoto et al. |
| 2002/0061176 A1 | 5/2002 | Libori et al. |
| 2002/0114574 A1 | 8/2002 | Chandalia et al. |
| 2002/0131741 A1 | 9/2002 | Bayart et al. |
| 2002/0197039 A1* | 12/2002 | Carter et al. ............ 385/127 |
| 2003/0012535 A1 | 1/2003 | Town |
| 2003/0059185 A1 | 3/2003 | Russell et al. |
| 2003/0081915 A1* | 5/2003 | Fajardo et al. ............ 385/96 |
| 2003/0161599 A1 | 8/2003 | Broderick et al. |
| 2003/0165313 A1 | 9/2003 | Broeng et al. |
| 2003/0190129 A1 | 10/2003 | Bassett et al. |
| 2004/0052484 A1 | 3/2004 | Broeng et al. |
| 2005/0069269 A1 | 3/2005 | Libori et al. |

OTHER PUBLICATIONS

Knight, C.J., "Photonic Band Gap Guidance in Optical Fibers", Science, vol. 282, Issue 5393, pp. 1476-1478, Nov. 20, 1998.

A. Bjarklev et al., "Photonic Crystal Fibres", Kluwer Academic Publishers, 2003, (ISBN 1-4020-7610-X), Chapter 4, pp. 115-130.

Hansen et al., "Highly Nonlinear Photonic Crystal Fiber with Zero-Dispersion at 1:55 μm" Optical Fiber Communication Conference 2002 post deadline paper FA9, 2002).

* cited by examiner

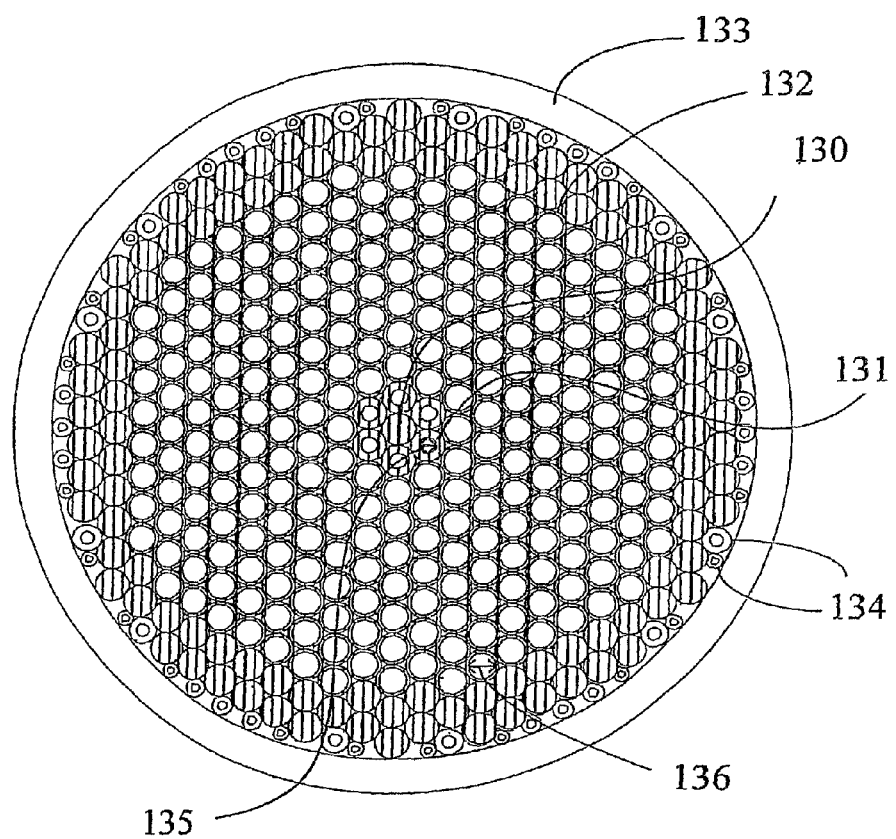
Fig. 13.a

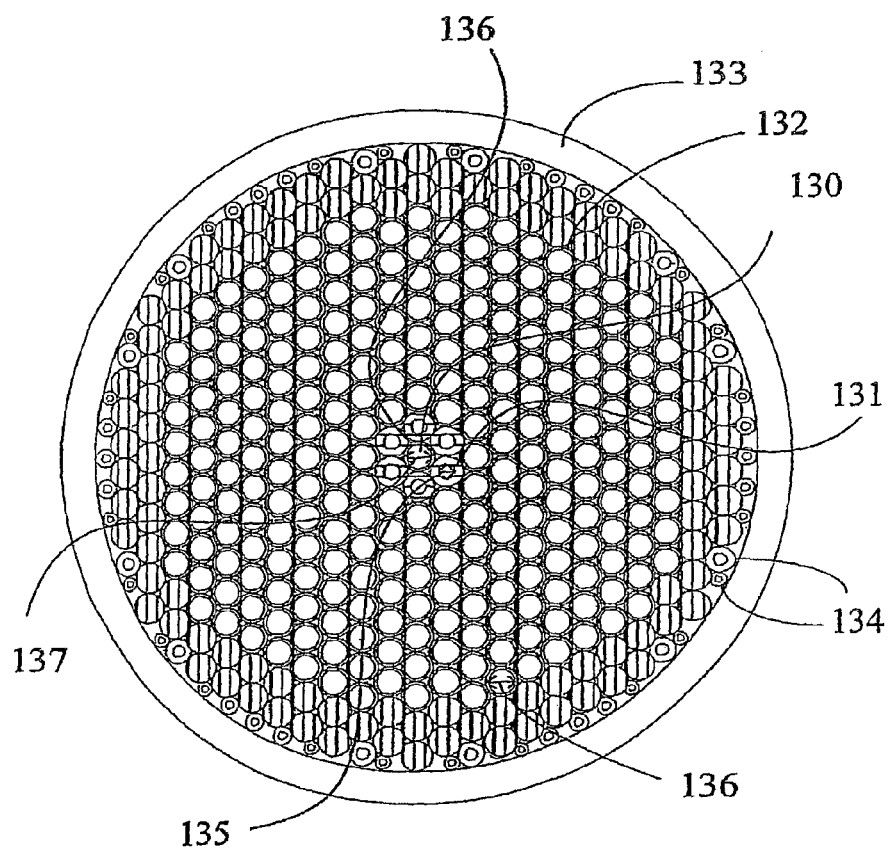
Fig. 13.b

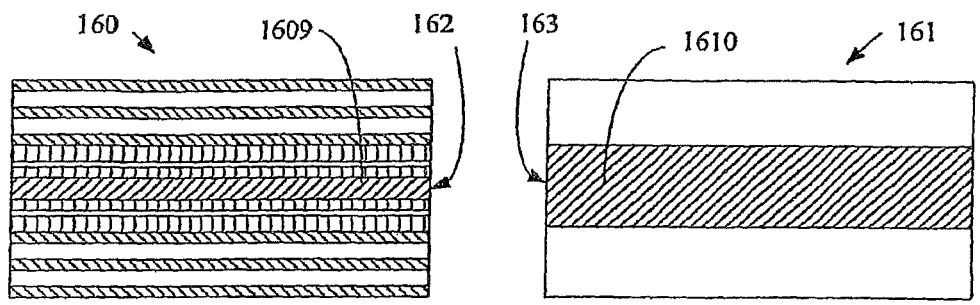
Fig. 16.a
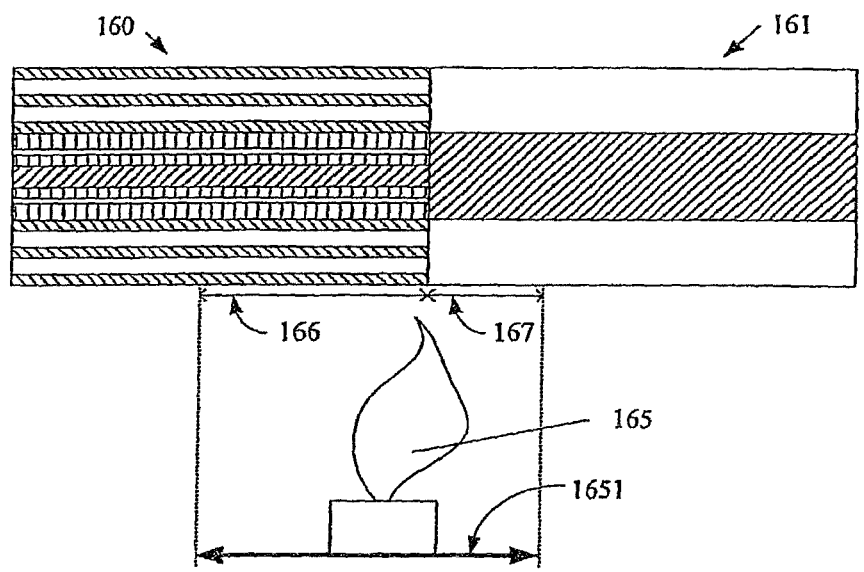
Fig. 16.b
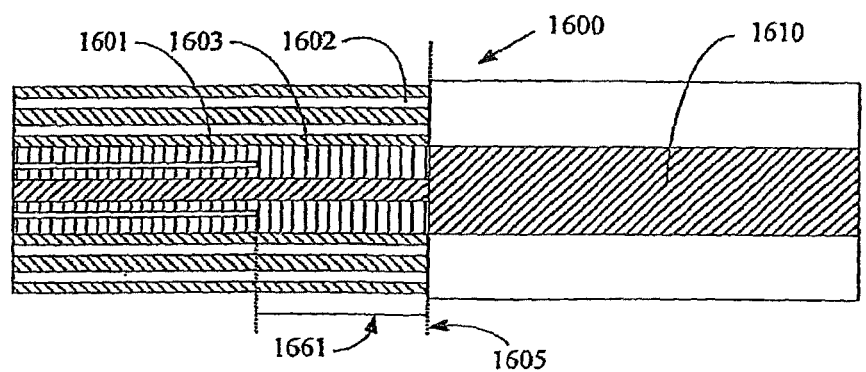
Fig. 16.c

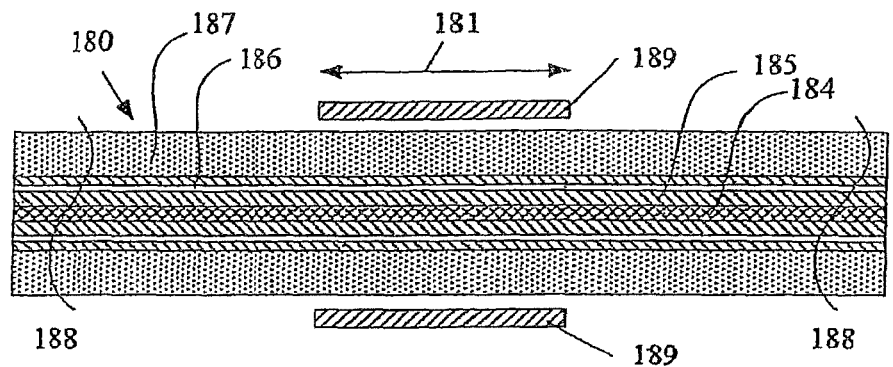
Fig. 18.a
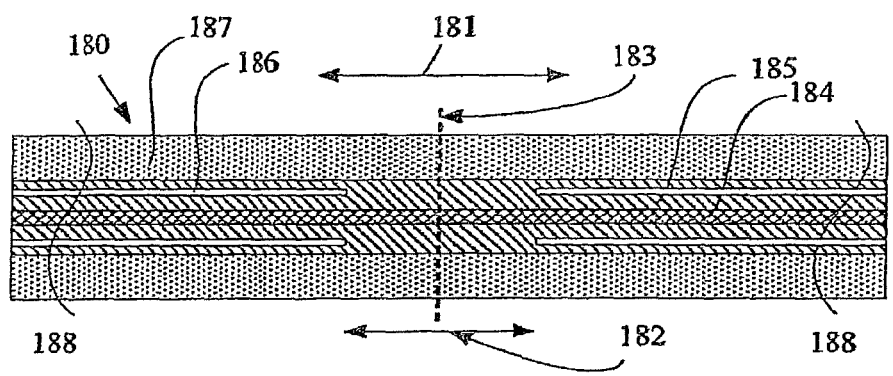
Fig. 18.b
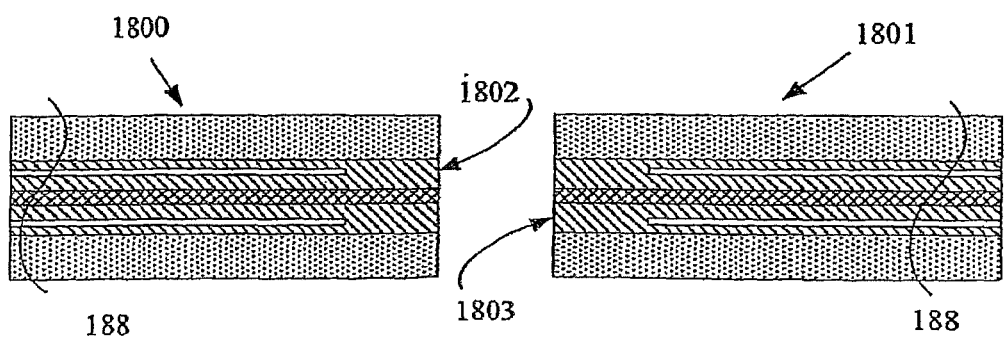
Fig. 18.c

SPLICING AND CONNECTORIZATION OF PHOTONIC CRYSTAL FIBRES

CROSS-REFERENCE TO RELATED APPLICATIONS

The present application is a divisional application of U.S. Ser. No. 11/641,663, which was filed in the U.S. Patent & Trademark Office on Dec. 20, 2006, and which is a divisional of U.S. Ser. No. 10/535,628, which was filed in the U.S. Patent & Trademark Office on May 20, 2005, and which is now abandoned. U.S. Ser. No. 10/535,628 is a national stage application of PCT/DK2003/000804, which was filed on Nov. 27, 2003, and which claims the priority of Danish patent application no. PA200201812, which was filed on Nov. 23, 2002. The entirety of U.S. Ser. No. 11/641,663; U.S. Ser. No. 10/535,628; PCT/DK2003/000804; and Danish patent application no. PA200201812 are incorporated herein by reference.

BACKGROUND OF THE INVENTION

The present invention relates to a method of coupling a spliceable optical fibre to an optical component; a spliceable optical fibre; a preform for producing a spliceable optical fibre; a method of producing a spliceable optical fibre comprising drawing of the preform; a heat-treated spliceable optical fibre; an article comprising a spliceable optical fibre.

1. The Technical Field

In recent years a new class of optical fibres has appeared. The optical guiding mechanism in these fibres is provided by introducing a number of holes or voids in the optical fibres. These holes typically run parallel with the fibre and extend along the fibre length. Such fibres are generally described by A. Bjarklev et al. in "Photonic Crystal Fibres", Kluwer Academic Publishers, 2003 (ISBN 1-4020-7610-X), which is referred to in the following as [Bjarklev et al.]).

The light guiding principle can either be based on Total Internal Reflection (TIR) similar to the guiding principle of traditional optical fibres (non-microstructured optical fibres, also termed 'standard optical fibres' in the following), which do not comprise such holes, or it can be based on the Photonic Band Gap (PBG) principle.

For TIR-based optical fibres, the core typically consists of solid glass, which has a larger refractive index than the effective refractive index of the surrounding cladding region, which includes a number of closely spaced holes.

For PBG-based optical fibres, the core is not limited to a solid material. It can be a hole, or a combination of a solid background material and holes, surrounded by a cladding region comprising a solid background material and holes arranged in a predetermined pattern therein. The refractive index of the core can take any value, since light guiding is given by the fact that light cannot propagate through a cladding region comprising a cladding material with patterned holes. Consequently, light is confined within the core. The cladding region typically comprises a cladding material and carefully arranged air holes of predetermined hole size, distance and pattern. However, generally the holes can be any so-called feature comprising a material having a refractive index different from that of the background material.

Both types of optical fibres rely on air holes, or features in the cladding, to give them their optical properties. In general, these types of optical fibres will in the following be called photonic crystal fibres (PCFs). Optical fibres of this type are also known as microstructured fibres, holey fibres, photonic band gap fibres, hole-assisted optical fibres, as well as other names may be used.

Recent PCFs have characteristics quite different from conventional, solid glass optical fibres and thus find applications in a range of different fields. To increase possible applications of these PCFs, the coupling technology applied is very important, both for coupling light between different optical fibres and for coupling light between PCFs and optical components.

2. Prior Art Disclosure

Transition from small core PCFs to standard optical fibers is generally difficult. Splice losses are typically high ($\geq 0.3$ dB—see e.g. Hansen et al., "*Highly Nonlinear Photonic Crystal Fiber with Zero-Dispersion at 1.55 μm*" Optical Fiber Communication Conference 2002 post deadline paper, 2002), and the mechanical strength is poor when short term heating (sometimes referred to as "cold" splices) is used.

Tapering of PCF may be used to provide low loss transition coupling from PCF to standard optical fibres (see e.g. WO00049435 or EP01199582). However, tapering is time-consuming and laborious work involving manufacturing of tapered optical fibre regions. Furthermore, due to significantly reduced fibre diameter (typically a few tens of micrometers), the strength of optical fibres with tapered regions is lower than for un-tapered optical fibres.

US 2002/0114574-A1 discloses a heating and stretching technique for partially or fully collapsing a microstructured optical fibre in a tapered form, or in a non-tapered form keeping the overall diameter about the same, and providing a resultant optical fibre exhibiting mode contraction or mode expansion, respectively. A microstructured fibre with a single cladding region (apart from an over-cladding) with a single background material is disclosed.

DISCLOSURE OF THE INVENTION

It is an object of the present invention to provide an improved method of coupling a photonic crystal fibre to an optical component, in particular to an optical fibre such as a photonic crystal fibre, a non-microstructured optical fibre, or other optical component.

Another object is to devise improved photonic crystal fibre designs for controlling the mode expansion at the end of the fibre.

It is an object of the present invention to provide PCFs that can be spliced with low loss and/or high strength to standard optical fibres. Especially, it is an object to provide small core PCFs that can be spliced with low loss and/or high strength to standard optical fibres.

It is a further object to provide low-loss and/or high strength splices or splicings between PCF and standard non-microstructured optical fibre.

It is a further object to provide methods for making a low-loss and/or high strength splice between PCF and standard non-microstructured optical fibres.

It is a further object of the present invention to provide use of PCFs with improved splice properties and splicings incorporating such PCFs.

Further objects appear from the description elsewhere.

Solution According to the Invention

In an aspect according to the present invention, these objects are fulfilled by providing a method of coupling a spliceable optical fibre for transmission of light in its longitudinal direction to an optical component, the method comprising:

(A) providing the spliceable optical fibre, said spliceable optical fibre comprising:
(a) a core region; and
(b) a microstructured cladding region, said cladding region surrounding said core region and comprising:
(b1) an inner cladding region with inner cladding features arranged in an inner cladding background material with a refractive index $n_1$, said inner cladding features comprising thermally collapsible holes or voids, and
(b2) an outer cladding region with an outer cladding background material with a refractive index $n_2$;
said spliceable optical fibre having at least one end;
(B) collapsing said thermally collapsible holes or voids by heating said least one end of said spliceable optical fibre; and
(C) coupling said collapsed spliceable optical fibre end to the optical component;
which collapsed inner cladding holes or voids at the end of said collapsed spliceable optical fibre ensures that the inner cladding refractive index at the end is raised relative to the refractive index of the core of the uncollapsed fibre. Thereby the core in the collapsed part of the fibre is enlarged. This allows light guided in the fibre to be expanded in the part where the inner cladding holes or voids have been collapsed—i.e. light is expanded to fill the collapsed inner cladding. Hence a coupling to an optical component having a spot size matching the expanded spot size of the collapsed inner cladding is possible with a low loss.

In a preferred embodiment, it can be achieved that the light can be coupled with low loss from a core with a dimension $d_{c1}$ of the un-collapsed fibre to a core with a dimension $d_{c2}$ of another optical fibre wherein $d_{c1}$ is smaller than $d_{c2}$.

Collapsing of the thermally collapsible holes or voids can be accomplished in a number of different ways. Common of these ways are that heat is used to soften the background material(s) whereby the thermally collapsible holes or voids contact. Surface tension, evacuation of fluids by pressure control and/or other means may assist in the contraction.

In a preferred embodiment, said collapsing of said thermally collapsible holes or voids being gradual and/or abrupt whereby adiabatic expansion and/or expansion over a short length of the fibre can be obtained.

In another preferred embodiment, said thermally collapsible holes or voids are wholly or partially collapsed whereby further control of the index profile at the fibre end can be achieved.

Generally heating can be accomplished in any suitable way whereby energy is conveyed to the inner cladding region such as thermal, inductive, radiative absorption or other means.

In a preferred embodiment, said heating is being adapted so that a guided mode at said at least one end of the spliceable optical fibre is confined by an index profile determined by background materials of the core and the outer cladding; said index profile providing an expanded core at the fibre end, and the outer cladding providing the actual cladding of said at least one fibre end whereby it is obtained that light is expanded to an increased size suitable for efficient/low loss coupling of e.g. splicing and connectorization.

In a preferred embodiment, said heating is provided by a fusion splicer whereby commercially available equipment suitable for controlling the heat treatment can be used.

Generally a coupling can be accomplished in any suitable way which allows a low loss transmission of light to/from one optical component to another. Such methods include fusion, free space optics, index matching glue, etc.

In a preferred embodiment, said coupling comprises fusing of said at least one collapsed spliceable optical fibre end and said optical component whereby the spliceable fibre can be coupled to the optical component with a low loss and large mechanical strength.

Generally an optical component in the present context includes any component which propagates light (e.g. an optical fibre, such as a photonic crystal fibre or a non-microstructured fibre); any component which supplies light (e.g. a light source such as a laser); any component which receives light (e.g. a detector); and/or any component which can be used for connecting one optical component to another such as an optical connector.

In a preferred embodiment, said optical component is an optical fibre, an optical connector, or a combination thereof whereby a low loss fibre to fibre connector or a low loss connector for fixating the fibre end to other optical components, e.g. lasers, detectors, etc. can be obtained.

In a further preferred embodiment, said optical fibre is a photonic crystal fibre, or a non-microstructured optical fibre whereby a low loss coupling of a spliceable optical fibre and said optical fibre (e.g. in the form of a spliced coupling or connectorized coupling) can be obtained.

In an embodiment, a method of splicing spliceable optical fibres is provided, the method comprising the steps of
(a) providing a first spliceable optical fibre according to the invention, the spliceable optical fibre having an end;
(b) providing a second optical fibre having an end;
(c) aligning said ends of said first and second optical fibres relative to each other at a predetermined mutual distance; and
(d) subjecting a to-be-heated section of each of said optical fibres including said ends of said first and second optical fibres to a controlled heat treatment, thereby collapsing said collapsible inner cladding voids or holes of said spliceable optical fibre or fibres over at least a part of said to-be-heated sections.

In an embodiment, said second optical fibre is a standard fibre, such as a standard single mode fibre, such as an SMF-128 fibre.

In an embodiment, said second optical fibre is a micro structured optical fibre.

In an embodiment, said second optical fibre is a spliceable optical fibre according to the invention.

In an embodiment, said heat source of step (d) is a fusion splicer such as a Vytran FFS2000 fusion splicer.

"An Article Comprising a Spliceable Optical Fibre Coupled to an Optical Component":

In a further aspect according to the present invention, some or all of these objects are fulfilled by providing an article comprising a spliceable optical fibre coupled to an optical component obtainable by the method according to the invention.

"Spliceable Optical Fibre Comprising Cladding Regions Having Different Refractive Indices"

In another aspect according to the present invention, these objects are fulfilled by providing a spliceable optical fibre for transmission of light in its longitudinal direction, the optical fibre having a cross section perpendicular to the longitudinal direction, said optical fibre comprising
(a) a core region; and
(b) a microstructured cladding region, said cladding region surrounding said core region and comprising:
(b1) an inner cladding region with inner cladding features arranged in an inner cladding background material with a refractive index $n_1$, said inner cladding features comprising thermally collapsible holes or voids, and
(b2) an outer cladding region with an outer cladding background material with a refractive index $n_2$;

wherein said $n_1$ being larger than $n_2$;
whereby a photonic crystal fiber is obtained which has a refractive index of the inner cladding which is raised when said thermally collapsible holes or voids are collapsed; such an increased refractive index of the inner cladding ensuring expansion of the core.

The thermally compressible holes or voids are collapsed in any suitable way which ensures that a guided mode at the fibre end is confined by an index profile determined by the refractive indices of the resulting core and outer cladding.

In a preferred embodiment, the optical fibre according to the invention comprises a collapsed section or an end wherein said inner thermally collapsible holes or voids are collapsed whereby an optical fibre is obtained that has an end with an expanded spot size that may be matched to other optical components or an optical fibre that can be cleaved at the collapsed section such that a resulting end has similar expanded spot size.

In a preferred embodiment, said inner cladding features have a size of $d_1$ and said outer cladding region comprises outer cladding features (23) of size $d_2$ whereby an improved control of the effective index profile is provided.

In another preferred embodiment, the collapse is established by heating so that the inner cladding voids and holes are collapsed.

"A Spliceable Optical Fibre Comprising Inner and Outer Cladding Features of Different Sizes"

In still another aspect according to the present invention, these objects are fulfilled by providing a spliceable optical fibre for transmission of light in its longitudinal direction, the optical fibre having a cross section perpendicular to the longitudinal direction, said optical fibre comprising
(a) a core region; and
(b) a microstructured cladding region, said cladding region surrounding said core region and comprising:
(b1) an inner cladding region with inner cladding features arranged in an inner cladding background material with a refractive index $n_1$, said inner cladding features comprising thermally collapsible holes or voids having a size $d_1$, and
(b2) an outer cladding region with an outer cladding background material with a refractive index $n_2$, said outer cladding comprising thermally collapsible holes or voids having a size $d_2$;
wherein $d_2$ is larger than $d_1$;
whereby a photonic crystal fiber is obtained which has a refractive index of the inner cladding which is raised when said thermally collapsible holes or voids of the inner cladding are collapsed and the refractive index of the outer cladding is raised to a lesser extent because the holes and voids in the outer cladding are not completely collapsed; such an increased refractive index of the inner cladding ensuring expansion of the core.

In a preferred embodiment, the collapse is established by heating so that the smaller inner cladding voids and holes are collapsed before the larger outer cladding holes.

In a preferred embodiment, an optical fibre according to the invention comprises a collapsed section or a collapsed end wherein said inner thermally collapsible holes or voids are collapsed whereby an optical fibre is obtained that has an end with an expanded spot size that may be matched to other optical components or a fibre that can be cleaved at the collapsed section such that a resulting end has similar expanded spot size.

In a preferred embodiment, $n_1$ equals $n_2$ whereby one single background material can be used for fabricating the cladding).

In another preferred embodiment, $n_1$ is larger than $n_2$ whereby it is obtained that the inner as well as outer voids or holes may be collapsed.

In another preferred embodiment, $n_1$ and $n_2$ are different by less than 2%, such as less than 1%, such as less than 0.5% whereby a small or negligible influence from the index difference between the inner and outer cladding on light guided in core of the uncollapsed fibre is obtained.

In another preferred embodiment, the optical fibre comprises silica-based materials whereby the optical fibre can be made using well known materials and preferred index differences can be obtained by well known silica doping techniques.

In another preferred embodiment, said core region comprises a material with a refractive index $n_{core}$, and $n_{core}$ is equal to $n_1$ whereby core and inner cladding can be made of the same material, and in preferred embodiments the whole fibre can be made from a single material.

In another preferred embodiment, said core region comprises a material with a refractive index $n_{core}$, and $n_{core}$ is larger than $n_1$ whereby the controlling of the optical properties of the fibre, e.g. dispersion, nonlinearity, spot size, cut-off, etc. is facilitated.

In another preferred embodiment, said core region comprises material with a refractive index $n_{core}$, and $n_{core}$ is smaller than $n_1$ whereby the controlling of the optical properties of the fibre, e.g. dispersion, non-linearity, spot size, cut-off, etc. is facilitated.

In another preferred embodiment, said core region comprises a material with a refractive index $n_{core}$, and $n_{core}$ is smaller, equal to, or larger than $n_2$ whereby the controlling of the optical properties of the fibre, e.g. dispersion, non-linearity, spot size, cut-off, etc. is facilitated.

In another preferred embodiment, said core region has a diameter smaller than or equal to 3.0 µm whereby an optical fibre with a small core (≤3 µm) that can couple light with low loss to other optical components can be obtained.

In an embodiment of the invention, said optical fibre has at least one fibre end wherein said inner cladding features of holes or voids have been collapsed so that a guided mode at the at least one fibre end is substantially confined by the index difference between $n_1$ and $n_2$.

In another embodiment of the invention, said optical fibre has at least one position, position 1, along its length where a guided mode at a given wavelength, $\lambda$, is confined to the core region by the presence of inner cladding features, such that there is obtained a mode field diameter that is substantially determined by a diameter of the core region, and the optical fibre, furthermore, has at least one fibre end wherein said inner cladding features have been collapsed, such that a guided mode at $\lambda$ at the at least one fibre end is confined by an index profile determined by solid material parts of the core region and the outer cladding region, such that there is obtained a mode field diameter that is substantially determined by the diameter of the core region at position 1 and a mode field diameter that is substantially determined by the diameter of the inner cladding region at the at least one fibre end.

In another preferred embodiment of the invention, said optical fibre has at least one position, position 1, along its length where a guided mode at a given wavelength, $\lambda$, is confined to the core region by the presence of inner cladding features, and $\lambda$ is in the range from 0.4 µm to 2.0 µm.

In another preferred embodiment of the invention, the core region has a largest dimension, $r_{PCF}$, being in the range of 0.8 µm to 3.0 µm whereby an optical fibre with a small core (0.8-3.0 µm) that can couple light with low loss to other optical components can be obtained.

In another preferred embodiment of the invention, the inner cladding region has a largest dimension, $r_{solid}$, being in the range of 3.0 µm to 15.0 µm whereby an optical fibre with a small core that can couple light with low loss to other optical components having a spot size around 3.0-15 µm can be obtained. In practice, since the inner cladding features have been collapsed, a spot size from around 2.0 µm to 12.0 µm can be obtained.

In an embodiment of the invention, a core region at the fibre end has a largest dimension, $r'_{solid}$, being in the range of 2.0 µm to 12.0 µm.

"Preform"

In still a further aspect according to the present invention, at least some of these objects are fulfilled by providing a preform for producing a spliceable optical fibre according to the invention, the preform comprising longitudinal preform elements comprising:
(a) at least one core element comprising a material with refractive index $n_{core}$;
(b) inner cladding elements comprising a tubular element of a material with refractive index $n_1$, said tubular element being adapted to form a collapsible hole or void in the spliceable optical fibre; and
(c) outer cladding elements comprising a material with refractive index $n_2$;
whereby it is ensured that a spliceable optical fibre according to the invention having collapsible inner cladding holes and voids can be produced from the perform.

In an embodiment, the formation of collapsible holes or voids in the inner cladding of the produced optical fibre is obtained by selecting inner cladding preform elements with added softeners and selecting outer cladding preform elements without or with less softeners so that application of heat to the produced spliceable optical fibre ensures that the inner cladding holes and voids collapse.

In a preferred embodiment, $n_1$ is larger than $n_2$.

In another preferred embodiment, said tubular element of the inner cladding has an inner dimension $d_{1,preform}$ and said outer cladding elements comprising a tubular element with an inner dimension $d_{2,preform}$ and $d_{2,preform}$ is larger than $d_{1,preform}$.

In an embodiment, a preform according to the invention is provided wherein $n_1$ equals $n_2$, and wherein said formed thermally collapsible inner cladding features have a size $d_1$; said outer cladding elements forming thermally collapsible outer cladding features having a size $d_2$; and said sizes being selected so that $d_2$ is larger than $d_1$.

In another embodiment, a preform according to the invention is provided wherein $n_{core}$ is higher than $n_1$.

In another embodiment, a preform according to the invention is provided wherein $n_{core}$ is equal to $n_1$.

In another embodiment, a preform according to the invention is provided wherein $n_{core}$ is lower than $n_1$.

In another embodiment, a preform according to the invention is provided wherein said core element is a pure silica rod.

In another embodiment, a preform according to the invention is provided wherein said core element is a rod comprising doped silica, such as Ge, Al, F, B, Er, or Yb doped silica, or combinations of these.

In another embodiment, a preform according to the invention is provided wherein said inner cladding elements are pure silica tubes.

In another embodiment, a preform according to the invention is provided wherein said inner cladding elements are tubes comprising doped silica, such as Ge, Al, F, B, Er, or Yb doped silica, or combinations of these.

In another embodiment, a preform according to the invention is provided wherein said outer cladding elements are pure silica tubes.

In another embodiment, a preform according to the invention is provided wherein said inner cladding elements are tubes comprising down-doped silica, such as F doped silica.

In another embodiment, a preform according to the invention is provided wherein said preform comprises an overcladding tube.

In another embodiment, a preform according to the invention is provided wherein said preform comprises an overcladding tube.

In another embodiment, a preform according to the invention is provided wherein said preform comprises buffer elements, such as rods and/or tubes with a smaller cross-sectional size than the outer cladding elements.

In another embodiment, a preform according to the invention is provided wherein said preform comprises a given number of inner cladding elements, and said number is in the range from 6 to 18, such as equal to 6.

In another embodiment, a preform according to the invention is provided wherein said core element, said inner cladding element, and said outer cladding elements are a rod, a tube, or both.

"A Method of Producing a Spliceable Optical Fibre"

In still a further aspect according to the present invention, at least some of these objects are fulfilled by providing a method of producing a spliceable optical fibre according to the invention, the method comprising drawing an optical fibre from a preform according to the invention.

"A Spliceable Optical Fibre"

In still a further aspect according to the present invention, at least some of these objects are fulfilled by providing a spliceable optical fibre according to the invention obtainable by a method according to the invention.

"A Heat-Treated Spliceable Optical Fibre"

In still a further aspect according to the present invention, at least some of these objects are fulfilled by providing a heat-treated spliceable optical fibre comprising a spliceable optical fibre according to the invention, or a spliceable optical fibre obtainable by a method according to the invention, prepared by a heattreatment of at least one end or a section of the spliceable optical fibre.

"A Method of Modifying a Spliceable Optical Fibre"

In an embodiment of the invention, a method of modifying a spliceable optical fibre is provided, the method comprising the steps of:
(a) providing a length of a spliceable optical fibre according to the invention, the spliceable optical fibre having an end; and
(b) subjecting a section of said length of said spliceable optical fibre to a controlled heat treatment, so that said collapsible inner cladding voids or holes of said spliceable optical fibre are collapsed over at least a part of said heat-treated section.

In an embodiment, the method further comprises: step (c) cleaving said modified spliceable optical fibre in said part of said to-be-heated section where said collapsible inner cladding voids or holes have been collapsed thereby providing two separate lengths of optical fibre each having a heat-treated end wherein said collapsible inner cladding voids or holes have been collapsed.

In an embodiment, all voids or holes in said spliceable optical fibre is collapsed and/or sealed during the heat treatment of step (b).

In an embodiment, said part of said to-be-heated section includes said end of said spliceable optical fibre.

In an embodiment, the method further comprises the step of (d) providing said heat-treated end with a well defined end facet, e.g. by polishing.

In an embodiment, said heat-treated end of said fibre and said well defined end facet of step (d) are adapted to form part of an optical connector.

"An Article Comprising an Optical Fibre According to the Invention"

In still a further aspect according to the present invention, at least some of these objects are fulfilled by providing an article comprising an optical fibre according to the invention, or a spliceable optical fibre and optical component coupling obtainable by a method according to the invention, wherein said article is a non-linear fibre component, or a dispersion compensating fibre component.

"Another Article Comprising an Optical Fibre According to the Invention"

In still a further aspect according to the present invention, at least some of these objects are fulfilled by providing an article comprising an optical fibre according to the invention, or a spliceable optical fibre and optical component coupling obtainable by a method according to the invention, wherein an outer diameter of the optical fibre is substantially uniform along the axial direction.

Further Aspects and Embodiments

According to one aspect of the present invention, these objects are fulfilled by providing an optical fibre having an axial direction and a cross section perpendicular to said axial direction, said optical fibre comprising a core region, an inner cladding region and an outer cladding region, wherein said inner cladding region comprises inner cladding features and an inner background material of refractive index n1, and said outer cladding region comprises an outer background material of refractive index n2, and n1 is larger than n2.

In a preferred embodiment, said core region comprises material with a refractive index ncore, and ncore is equal to n1. This provides for example to use similar background material for the inner cladding region and the core region.

In a preferred embodiment, said core region comprises material with a refractive index ncore, and ncore is larger than n1. This allows for example to design an optical fibre with a high nonlinear coefficient, to tailor the dispersion properties of the optical fibre, and/or to tailor the cut-off properties of the optical fibre.

In a preferred embodiment, said core region comprises material with a refractive index ncore, and ncore is smaller than n1. This allows for example to tailor the dispersion properties of the optical fibre, and/or to tailor the cut-off properties of the optical fibre.

In a preferred embodiment, said core region comprises material with a refractive index ncore, and ncore is smaller, equal to, or larger than n2.

In a preferred embodiment, said core region has a diameter smaller than 3.0 µm, for example in a case where the optical fibre is used for generation of nonlinear effects.

In a preferred embodiment, said optical fibre has at least one end being solid, such as a solid end being obtained by collapsing any holes or voids in the end of the fibre. This allows to make a splicing to the solid end of the optical fibre where a high temperature is applied in order to produce a high-strength splicing.

In a preferred embodiment, said optical fibre has at least one end wherein said inner cladding features have been collapsed, such that a guided mode at the fibre end is confined by an index profile determined by the refractive indices of the solid parts (i.e. background materials) of the core and outer cladding.

In a preferred embodiment, said optical fibre has at least one position along its length where a guided mode at a given wavelength, □, is confined to the core region by the presence of inner cladding features, such that there is obtained a mode field diameter that is substantially determined by the diameter of the core region, and the optical fibre, furthermore, has at least one end wherein said inner cladding features have been collapsed, such that a guided mode at the wavelength □ at the fibre end is confined by an index profile determined by the refractive indices of the solid parts of the core and outer cladding, such that there is obtained a mode field diameter that is substantially determined by the diameter of the inner cladding region at the fibre end. In this manner there is obtained an expansion of the mode field diameter for a mode guided along the fibre to a mode guided at the fibre end, such that for example a mode matching to a standard optical fibre may be obtained at the fibre end. This provides means for making a low-loss optical splicing with respect to mode matching.

According to a second aspect of the present invention, these objects are fulfilled by providing an optical fibre having an axial direction and a cross section perpendicular to said axial direction, said optical fibre comprising a core region, an inner cladding region and an outer cladding region, said inner cladding region comprises inner cladding features of size, d1, and said outer cladding region comprises outer cladding features of size, d2, and d2 is larger than d1, said optical fibre has at least one end, wherein said inner cladding features are collapsed, and said outer cladding features are non-collapsed, such that d1 is equal to zero and d2 is larger than zero.

Other objects, features and advantages of the present invention will be more readily apparent from the detailed description of the preferred embodiments set forth below, taken in conjunction with the accompanying drawings.

Specific Aspects and Embodiments

One object of the invention is to provide an optical fibre having an axial direction and a cross section perpendicular to said axial direction, said optical fibre comprising a core region for propagating the light to be transmitted in the longitudinal direction of the optical fibre and a microstructured cladding region said core region. The microstructured cladding region comprising an inner cladding region with inner cladding features of size d1 being arranged in an inner cladding background material with refractive index n1, and an outer cladding region with an outer cladding region with an outer cladding background material with refractive index n2;

wherein n1 is larger than n2.

In one embodiment, the—comprises at least one fibre end having collapsed inner cladding features.

The outer cladding region may further comprise outer cladding features of size d2.

In one embodiment, the fibre comprises a fibre end having collapsed inner cladding features and collapsed outer cladding features.

One object of the invention is to provide an optical fibre having an axial direction and a cross section perpendicular to said axial direction, said optical fibre comprising a core region for propagating the light to be transmitted in the longitudinal direction of the optical fibre; and a microstructured cladding region, said cladding region surrounding said core region.

The microstructured cladding region comprising an inner cladding region with inner cladding features of size d1 being arranged in an inner cladding background material with refractive index n1, and an outer cladding region with outer cladding features of size d2 being arranged in an outer cladding background material with refractive index n2, wherein d2 is larger than d1; and
said optical fibre comprises at least one fibre end having collapsed inner cladding features.

The difference n1 and n2 may be less than 2%, such as less than 1%, such as less than 0.5%.

In one embodiment, the optical fibre comprises silicabased materials and the inner cladding features and any optional outer cladding features are holes or voids.

In one embodiment, the core region comprises material with a refractive index ncore, and ncore is equal to n1.

In one embodiment, core region comprises material with a refractive index ncore, and ncore is larger than n1.

In one embodiment, the core region comprises material with a refractive index ncore, and ncore is smaller than n1.

In one embodiment, the core region comprises material with a refractive index ncore, and ncore is smaller, equal to, or larger than n2.

In one embodiment, the core region has a diameter smaller than 3.0 μm.

The optical fibre may have at least one fibre end wherein said inner cladding features have been collapsed, such that a guided mode at the at least one fibre end is substantially confined by the index difference between n1 and n2.

The optical fibre may have at least one position, position 1, along its length where a guided mode at a given wavelength, $\lambda$, is confined to the core region by the presence of inner cladding features, such that there is obtained a mode field diameter that is substantially determined by a diameter of the core region, and the optical fibre, furthermore, has at least one fibre end wherein said inner cladding features have been collapsed, such that a guided mode at $\lambda$ at the at least one fibre end is confined by an index profile determined by solid material parts of the core region and the inner cladding region, such that there is obtained a mode field diameter that is substantially determined by the diameter of the core region at position 1 and a mode field diameter that is substantially determined by the diameter of the inner cladding region at the at least one fibre end.

$\lambda$ may be in the range from 0.4 μm to 2.0 μm.

In one embodiment, the core region has a largest dimension, $r_{PCF}$, being in the range of 0.8 μm to 3.0 μm.

In one embodiment, the inner cladding region has a largest dimension, $r_{solid}$, being in the range of 3.0 μm to 15.0 μm.

In one embodiment, the core region at the fibre end has a largest dimension, $r'_{solid}$, being in the range of 2.0 μm to 12.0 μm.

One object of the invention is to provide a method for making an optical fibre according to the present invention, said method comprising heat-treatment of at least one end of an optical fibre such that inner cladding features collapse.

In one embodiment, the at least one end is heat-treated such that inner cladding features collapse.

One object of the invention is to provide an optical fibre splicing comprising optical fibre according to the present.

One object of the invention is to provide an optical fibre splicing comprising an optical fibre according to the present invention and a microstructured optical fibre.

One object of the invention is to provide an optical fibre splicing comprising an optical fibre according to the present invention and another optical fiber according to the present invention.

One object of the invention is to provide a method for making an optical fibre splicing according to the present invention, wherein said method comprises heat-treatment of an end of an optical fibre according to the present invention and fusing a standard optical fibre or a microstructured optical fibre or another optical according to the present invention.

One object of the invention is to provide an article comprising an optical fibre according to the present invention, or an optical fibre splicing according to the present invention, wherein said article is a non-linear fibre component.

One object of the invention is to provide and article comprising an optical fibre according to the present invention, or an optical fibre splicing according to the present invention, wherein said article is a dispersion compensating fibre component.

One object of the invention is to provide an article comprising an optical fibre according to the present invention, or an optical fibre splicing according to the present invention, wherein an outer diameter of the optical fibre is substantially uniform along the axial direction.

In one embodiment, the method comprises pushing ends of two optical fibres towards each other during fusing to obtain a substantially uniform outer fibre diameter across said optical fibre splicing.

One object of the invention is to provide a preform for making an optical fibre, wherein said preform comprises
(a) at least one core element comprising material with refractive index ncore,
(b) inner cladding elements comprising material with refractive index n1,
(c) outer cladding elements comprising material with refractive index n2;
wherein n1 is larger than n2.

In one embodiment of the preform, ncore is higher than n1.
In one embodiment of the preform, ncore is equal to n1.
In one embodiment of the preform, ncore is lower than n1.
In one embodiment of the preform, the core element is a pure silica rod.

In one embodiment, the core element of the preform is a rod comprising doped silica, such as Ge, Al, F, B, Er, or Yb doped silica, or combinations of these.

In one embodiment, the said inner cladding elements are pure silica tubes.

In one embodiment, said inner cladding elements are tubes comprising doped silica, such as Ge, Al, F, B, Er, or Yb doped silica, or combinations of these.

The cladding elements are pure silica tubes.

The inner cladding elements may be tubes comprising down-doped silica, such as F doped silica.

The preform may comprise an overcladding tube.

In one embodiment, the preform comprises buffer elements, such as rods and/or tubes with a smaller cross-sectional size than the outer cladding elements.

The preform may comprise a given number of inner cladding elements, and said number is in the range from 6 to 18, such as equal to 6.

One object of the invention is to provide an optical fibre drawn from a preform according to the present invention.

In one embodiment, the optical fibre has been drawn from a preform according to the present invention.

The optical fibre may be an index-guiding photonic crystal fibre.

The optical fibre may be a photonic bandgap fibre.

Definition of Terms and Expressions

In the present context the feature in the form of holes and voids are shown in cross sectional views as circles wherein a diameter (e.g. $d_1$) is generally used to indicate the size or maximum inner dimension of the feature. It is intended that the holes or voids may exhibit any form in which case the relevant dimension for its characterization is its maximum, inner dimension.

In the present context there is made a distinction between the term "refractive index" and the term "effective refractive index".

The refractive index is the conventional refractive index of a homogeneous material. The effective refractive index is the index that light at a given wavelength, $\square$, experiences when propagating through a given material that may be complex (meaning that the material complex comprises two or more sub-materials, typically a background material of one refractive index and one or more type of features of different refractive index/indices). For homogeneous materials, the refractive and the effective refractive index will naturally be similar. For complex materials (such as microstructures), the effective refractive index is further discussed below. The term refractive index is also used to describe the refractive index of a sub-material in a complex material (such as the refractive index of a feature in a microstructured material). The effective refractive index is generally not identical to the "weighted refractive index" or "geometrical index". These may be determined directly from geometric calculations for a given complex material when the refractive index of the sub-materials are known.

For optical fibres of the present invention, the most important optical wavelengths are in the visible to nearinfrared regime (wavelengths from approximately 400 nm to 2 μm). In this wavelength range most relevant materials for fibre production (e.g. silica) may be considered mainly wavelength independent, or at least not strongly wavelength dependent. However, for non-homogeneous materials, such as fibres with voids or air holes, the effective refractive index may be very dependent on the morphology of the material. Furthermore, the effective refractive index of such a fibre may be strongly wavelength dependent. The procedure of determining the effective refractive index at a given wavelength of a given fibre structure having voids or holes is well-known to those skilled in the art (see e.g. Jouannopoulos et al, "Photonic Crystals", Princeton University Press, 1995 or Broeng et al, Optical Fiber Technology, Vol. 5, pp. 305-330, 1999).

As appreciated within the field of microstructured fibres, the term "air holes" of the cladding and/or in the core may include holes or voids comprising a vacuum, gas or liquid, said holes or voids being fully or partly filled with a liquid or a gas after production of the microstructured optical fibre.

Within the present context it is intended that the term "spliceable optical fibre" is interpreted broadly to include the ability of an optical fibre to be spliced to another optical fibre or to be connected to another optical component, e.g. a connector, thereby ensuring coupling of the transmitted light to said other optical fibre or said other optical component with a reduced loss of light.

It is intended that the term "an end of an optical fiber" designates a longitudinal section of the optical fibre at an end thereof, including the end face thereof.

By thermally collapsible holes or voids is in the present context understood holes or voids that comprise a gas or vacuum or a liquid which can be removed e.g. by evacuation, and are surrounded by a material that may soften heated.

It is to be understood that the following detailed description is merely exemplary of the invention, and is intended to provide an overview or framework for understanding the nature and character of the invention as it is claimed. The accompanying figures are included to provide further understanding of (preferred embodiments of) the invention, and are incorporated in and constitute a part of the (of the disclosure of preferred embodiments of) invention. The invention is not limited to the described examples. The figures illustrate various features and embodiments of the invention and together with the description serve to explain the principles and operation of the invention.

BRIEF DESCRIPTION OF THE DRAWINGS

In the following, by way of examples only, the invention is further disclosed with detailed description of preferred embodiments. Reference is made to the drawings in which

FIGS. 13.a and 13.b show other schematic examples of optical fibre preforms according to embodiments of the present invention.

FIG. 16 is a schematic illustration of a method of coupling a spliceable photonic crystal fibre to a non-micro-structured optical fibre, FIGS. 16.a-16.c showing different steps of the splicing process.

FIG. 18 shows a length of a spliceable optical fibre according to the invention, which is subjected to a heat treatment over a section of its length, FIGS. 18.a, 18.b, and 18.c illustrating a situation before and after the heat treatment, respectively.

DETAILED DESCRIPTION

In order to explain the invention in more detail, the proceeding description shall be based on examples. The examples illustrate the concepts and design ideas that underlie the invention. It is to be understood that the examples are merely illustrative of the many possible specific embodiments which can be devised from the present invention as well as there exists many possible applications that may be devised from the principles of the invention. The presented examples are not intended to limit the scope of the invention.

Figure 1:
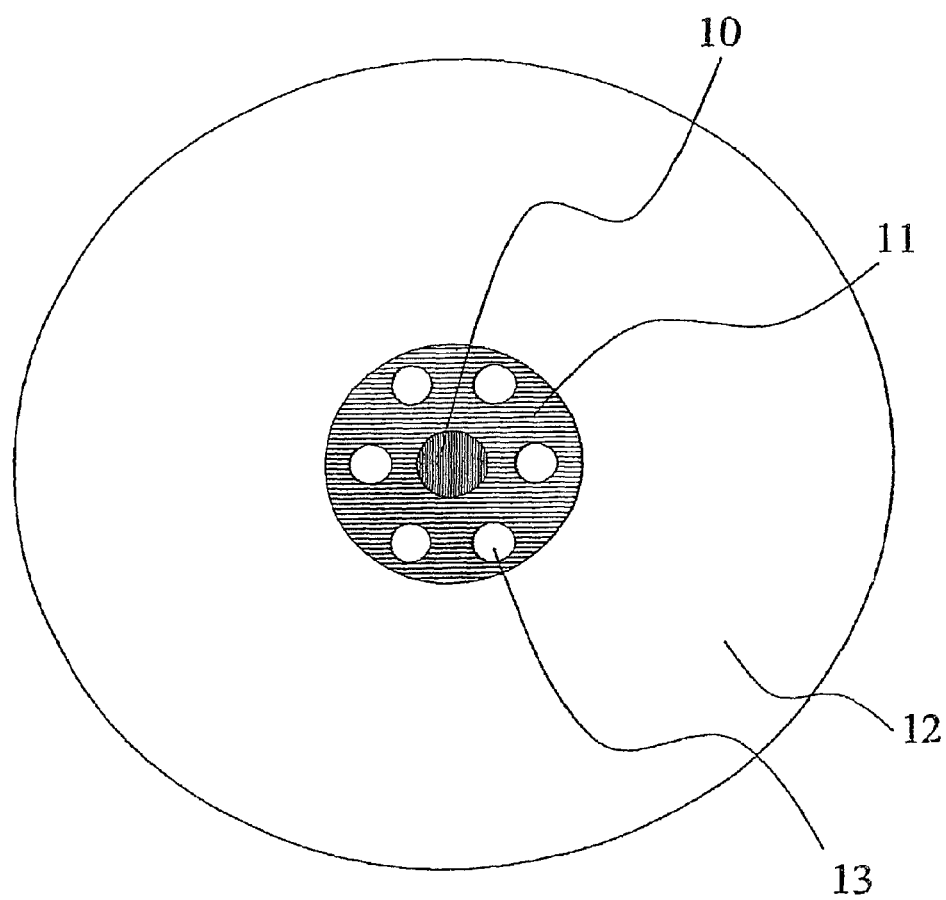
FIG. 1 shows a schematic example of a fibre according to the present invention.

The present invention discloses in a preferred embodiment a spliceable optical fibre, of which a cross sectional view perpendicular to a longitudinal direction of the fibre is shown schematically in FIG. 1. The fibre is a photonic crystal fibre comprising a core region 10 and a cladding region, the cladding region comprising an inner cladding region 11 and an outer cladding region 12. The inner cladding region comprises low-index inner cladding features 13, here including features in the form of holes or voids extending in the longitudinal direction of the fibre, and an inner cladding background material of refractive index $n_1$. The outer cladding region comprises an outer cladding background material of refractive index $n_2$. The optical fibre is characterized in that $n_1$ is larger than $n_2$. Optionally, the outer cladding region may comprise outer cladding features 23 e.g. in the form of holes or voids extending in a longitudinal direction of the fibre—as shown schematically in FIG. 2a and FIG. 2b for other preferred embodiments. The core region 10, 20, in FIGS. 1, 2a and 2b, respectively, may comprise a refractive index profile, such that the core region comprises material with a refractive index, $n_{core}$, being different from the refractive index, $n_1$, of a material in the inner cladding region—as shown schematically in FIG. 1 and FIG. 2b. Hence, $n_{core}$ may be higher or lower than $n_1$. In order to tune various properties of the optical fibre, it may be preferred to have a special refractive index profile of the core region—for example for tuning dispersion properties and nonlinear coefficient of the optical fibre. To provide largest degree of flexibility the present invention includes both preferred embodiments with $n_{core}$ higher and lower value than $n_1$. This provides a large degree of flexibility in the adaptation of the parameters determining the optical properties of the spliceable optical fibre including the optical coupling (e.g. the shape and extension of the mode field) to a particular component. For nonlinear applications for example, it may be preferred to have $n_{core}$ larger than $n_1$ to increase the nonlinear coefficient of the optical fibre. Alternatively, as shown schematically in FIG. 2a and FIG. 3 for yet other preferred embodiments of the present invention, the fibre core 20, 30 may comprise a material of similar refractive index as the inner cladding region (e.g. the background material 21, 31). All embodiments shown in FIGS. 1, 2 and comprise voids or holes 13, 22, 32 in the inner cladding region, the voids or holes extending in a longitudinal direction over at least a part of the length of the spliceable optical fibre. Naturally, any combination that may be obtained from the above-described embodiments are also covered by the present invention, such as for example a fibre as shown in a cross sectional view in FIG. 3 that further comprises outer cladding features, e.g. in the form of holes or voids or rods or combinations thereof having refractive indices different from that of the outer cladding background material 34.

Figure 2A:
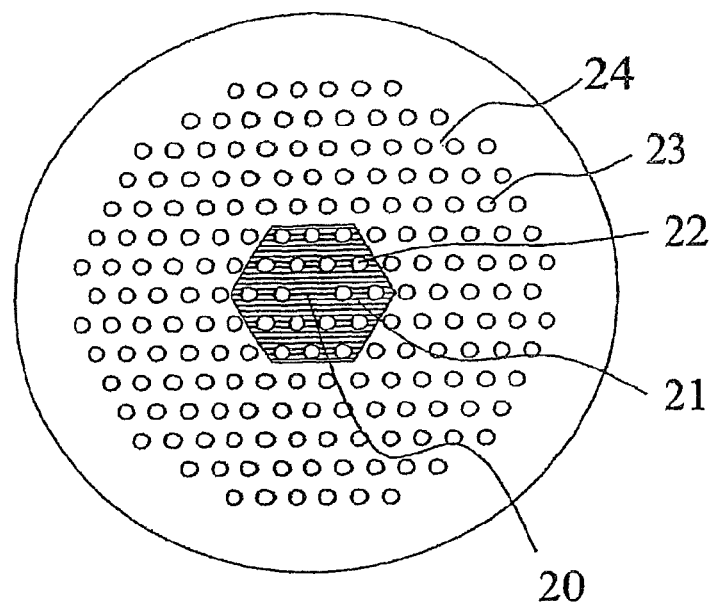
FIG. 2a and FIG. 2b shows schematic examples of other fibres according to the present invention.
Figure 2B:
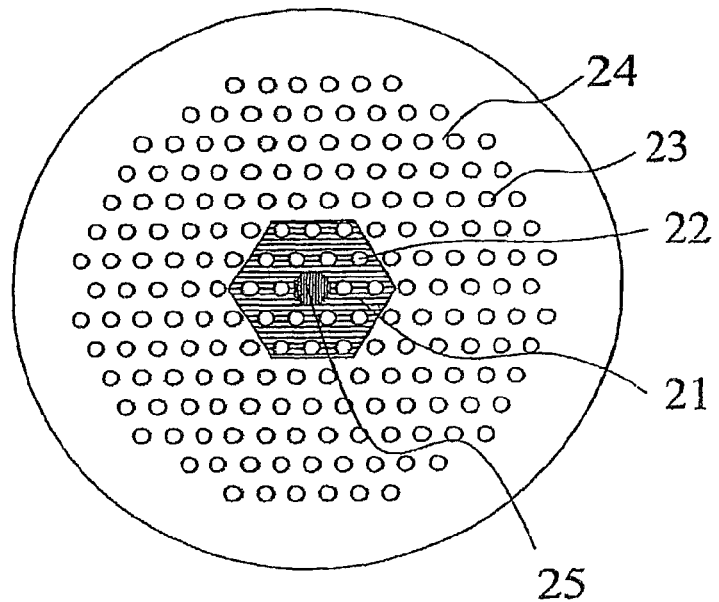

The spliceable optical fibre in FIG. 2a comprises a core region 20 with a material of refractive index $n_{core}$, and an inner cladding region with an inner cladding background material 21 of refractive index $n_1$ and inner cladding features 22 with a diameter $d_1$ (generally used to indicate size or maximum inner dimension). The holes or voids of the embodiments illustrated in the drawings are shown to have an essentially circular cross section. They may, however, be of other forms. The spliceable optical fibre further comprises an outer cladding region with an outer cladding background material 24 of refractive index $n_2$ and outer cladding features 23 (here in the form of holes or voids) with a diameter $d_2$. The fibre is characterized in that $n_1$ is larger than $n_2$. Preferably, the inner cladding region comprises a single or two rings of holes or voids 22 around the core region 20. The spliceable optical fibre in FIG. 2b resembles the fibre in FIG. 2a, but has a core 25 with a refractive index ($n_{core}$) different from that of the inner cladding background material ($n_1$), such as larger or smaller than $n_1$.

Figure 3:
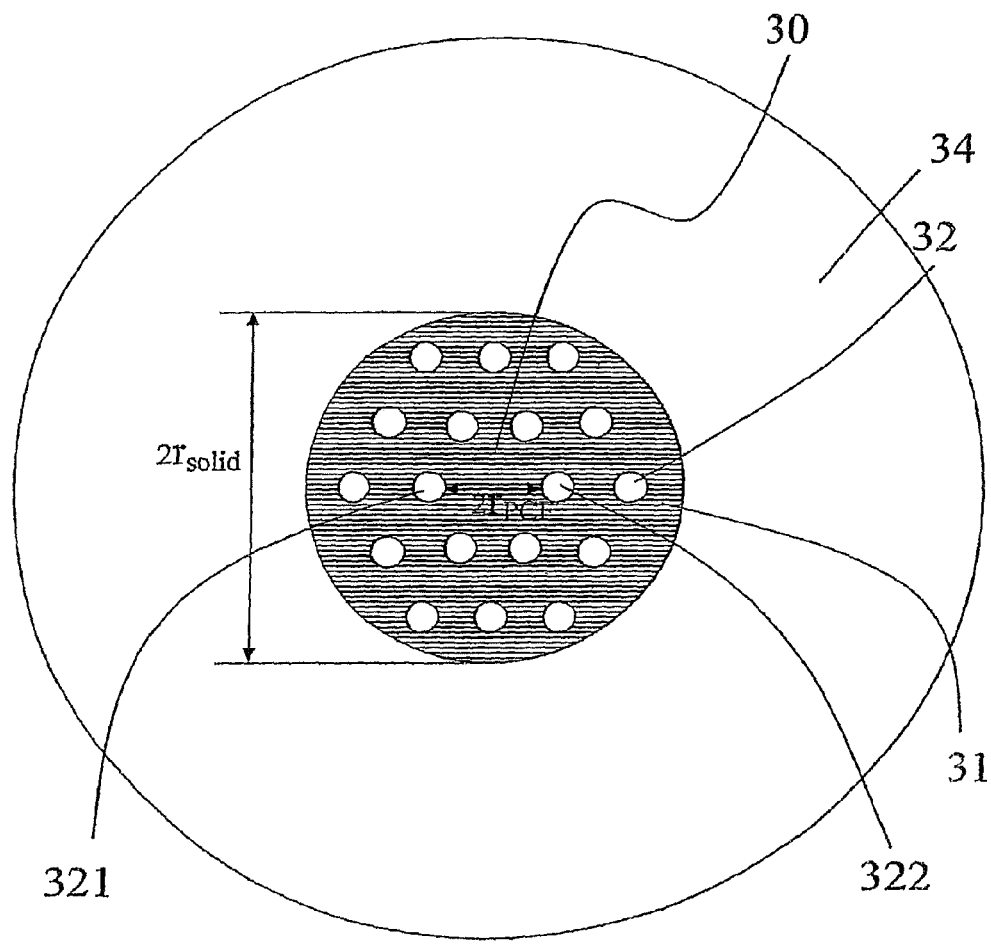
FIG. 3 shows a schematic example of yet another fibre according to the present invention.
Figure 4:
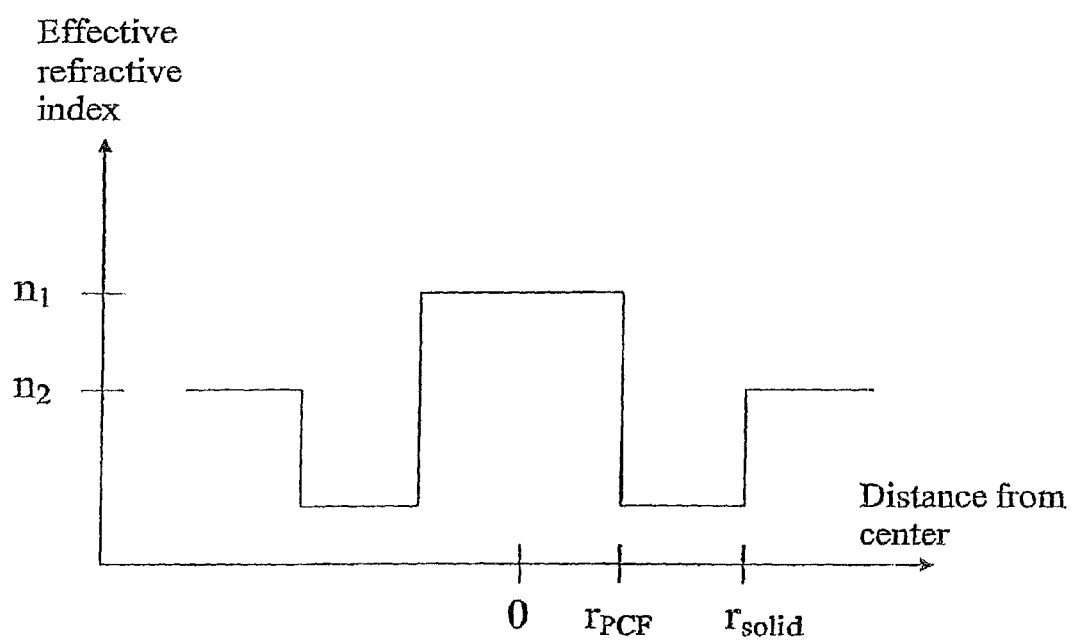
FIG. 4 shows a schematic example of a fibre profile for a fibre according to the present invention.

FIG. 4 shows schematically an effective index profile of a spliceable optical fibre according to a preferred embodiment. The centre of the fibre is labeled '0' on the 'Distance from center'-axis of FIG. 4. The radial distance labeled $r_{PCF}$ is equal to the radius of the core region, as defined by the half-distance between two opposite innermost inner cladding features 321, 322. The radial distance labeled $r_{solid}$ is equal to the radius or largest dimension of the inner cladding background material. The distances $2r_{PCF}$ and $2r_{solid}$ are indicated in FIG. 3 for illustrative purposes.

Other effective index profiles are also relevant, such as for example a profile that may have a higher effective refractive index of the outer cladding compared to the inner cladding.

The present inventors have realized that those of the here-disclosed PCFs having a higher background refractive index in an inner cladding region compared to that of an outer cladding region are especially advantageous for the realization of low or reduced splicing losses. This may be understood from the following description.

In addition to the effective index-guiding properties provided by the microstructured inner cladding for the fibres in FIGS. 1 to 3, (obtained using holes or voids), an additional (weaker) index guiding region is provided by the index difference between the inner and outer cladding background materials. This weaker guidance is substantially suppressed by the presence of holes or voids in the inner cladding. However, at a fibre end or at a fibre splice, where the holes or voids in the inner cladding region may be collapsed, the weaker guidance may become dominant. In the case of collapsed holes or voids in the inner cladding region, the fibre will—over the section of fibre where the holes have been collapsed—be characterized by an enlarged core region—defined by the index profile in the absence of holes (or collapsed holes). Hence, it becomes possible to expand the core region in a well-defined manner by design of the inner cladding features (including the holes or voids), the index difference between the inner and outer cladding background material and the dimensions of the various features of the fibre (including size and separation of inner cladding features (e.g. the form and maximum inner cross sectional dimension of voids or holes) and size of inner cladding region).

Figure 5:
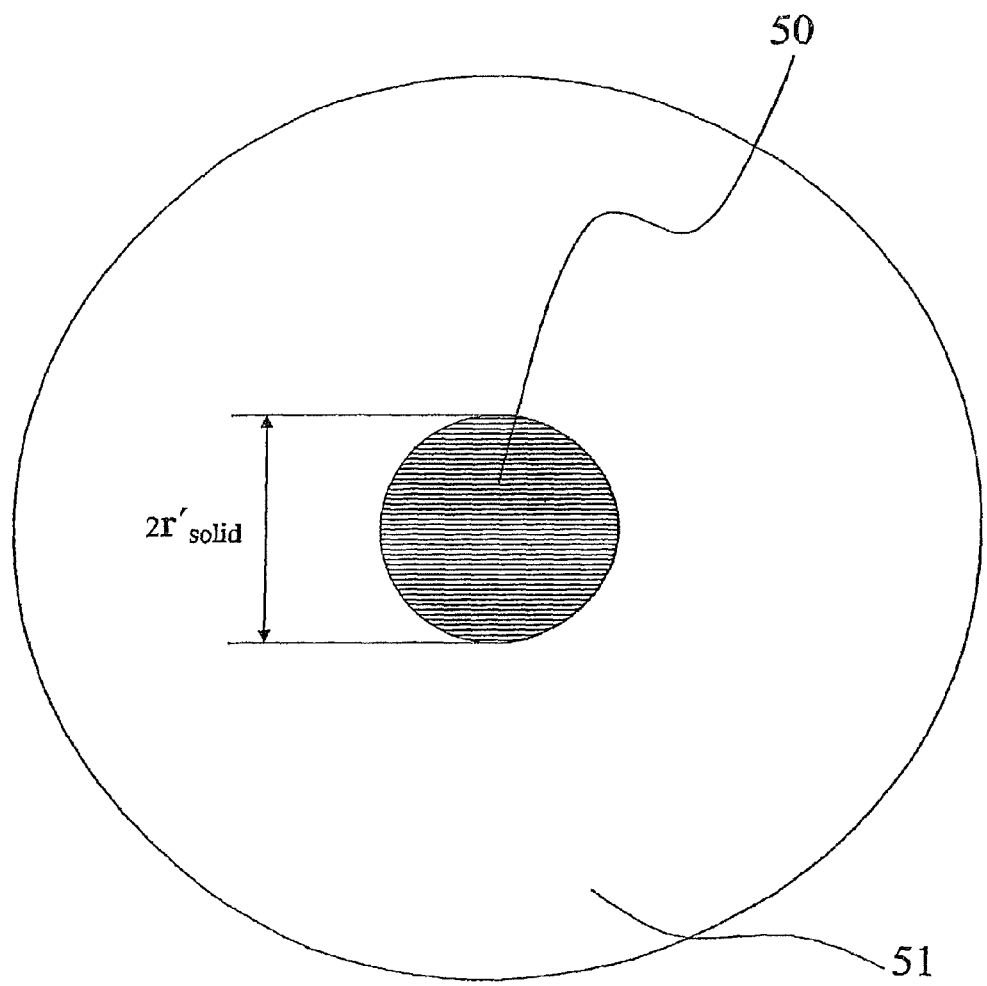
FIG. 5 shows a schematic example of an end of a fibre according to the present invention.
Figure 6:
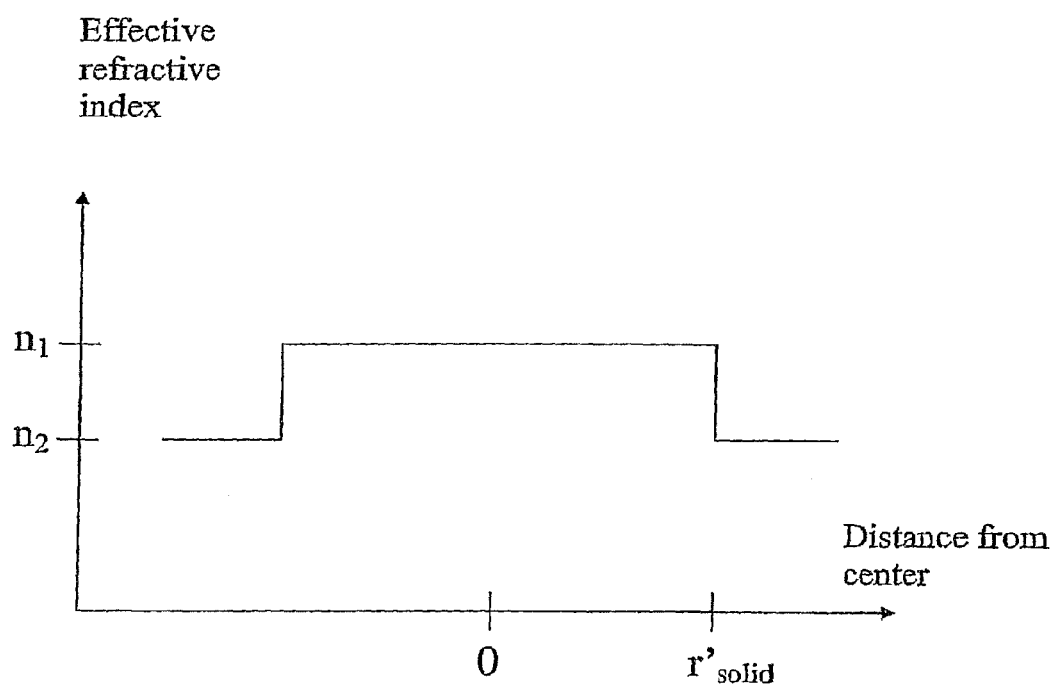
FIG. 6 shows a schematic example of a fibre profile for an end of a fibre according to the present invention.

FIG. 5 shows schematically a cross sectional view at a collapsed end of a fibre according to a preferred embodiment of the present invention (cf. e.g. FIG. 3). This collapsed end may be at a spliced end, a connectorized end (e.g. an end of a spliceable optical fibre forming part of an optical connector) or a "loose" end (e.g. an end of a spliceable optical fibre not being spliced to another fibre or connectorized, but e.g.

adapted for being coupled to an integrated optical circuit (OIC), e.g. by being positioned in a groove of the substrate of the OIC in the proximity of a planar optical waveguide). The inner (cf. e.g. 22, 32 of FIGS. 2a and 3, respectively) and any optional outer cladding voids or holes (cf. e.g. 23 of FIG. 2a) have been collapsed and the waveguiding is provided by the refractive index difference between the regions 50 (core) and 51 (cladding). Since the refractive index profile of the fibre at the collapsed end may be dimensioned accurately by choice of the materials and dimensions, a given mode field diameter (MFD) at the collapsed end may be obtained. Preferably, the collapsed end provides a MFD that matches a standard (solid, non-microstructured) optical fibre. FIG. 6 shows schematically the refractive index profile at the collapsed end (e.g. corresponding to the embodiment shown in FIG. 5), here $n_1$, $n_2$ designates the effective refractive index of the (enlarged) core region and (originally 'outer') cladding region, respectively. In preferred embodiments, the radius of the core, $r'_{solid}$ at the collapsed end is in the range from 2 µm to 12 µm.

In a preferred embodiment, the core diameter and the refractive index profile of the fibre at the collapsed end is chosen such that the fibre at the collapsed end has a V-parameter below 2.4 at a given wavelength, in order for the fibre at the collapsed end to be single mode. As an example, the diameter ($2*r'_{solid}$) of the core 50 at the collapsed end may have a largest dimension of around 4.7 µm ($r'_{solid}$=2.35 µm), an index difference between the core and cladding regions 50 and 51 of around $3*10^{-2}$ ($n_1-n_2=3*10^{-2}$), such that the fibre at the collapsed end is single mode at a wavelength of 1.55 µm. In further preferred embodiments, the fibre has an outer diameter of around 125 µm.

Figure 7:
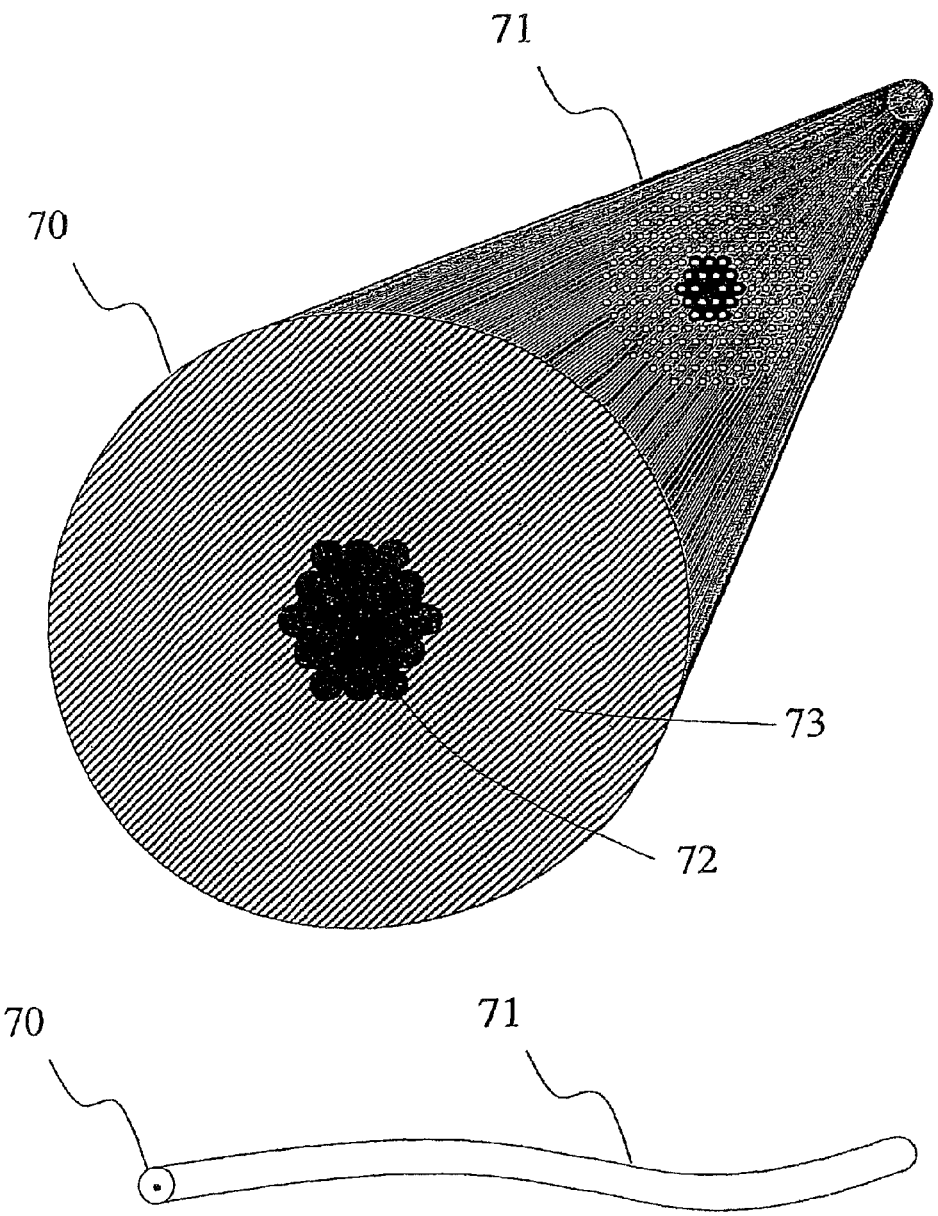
FIG. 7 shows a schematic example of a fibre according to the present invention. The figure illustrates the collapse of inner and outer cladding features in an end of the fibre, and that these features are open in a cross-section along the longitudinal direction of the fibre.

It is valuable to consider a spliceable optical fibre according to one of the various preferred embodiments in its longitudinal direction—as shown schematically in FIG. 7. The fibre comprises a first end 70, referred to as a collapsed end, where a section of the fibre, including an end face, has been treated such that the inner cladding features have been collapsed. Typically, this collapse is performed using heat-treatment as shall be discussed in further detail later. Preferably (but not necessarily) the optional outer cladding features (cf. e.g. 23 in FIG. 2) have also been collapsed. Thereby, an adiabatic transition from a (small) mode confined substantially by the inner cladding features at a given position 71 a certain distance away from the collapsed end 70 to a (larger) mode confined by the refractive index difference, here between the effectively enlarged core 71 and the modified cladding 72, at the collapsed end 70 can be obtained. Hence, the present invention provides spliceable optical microstructured fibres that at a fibre end may act as a standard (solid, non-microstructured) index-guiding fiber. Therefore, the ability to treat the collapsed end of the PCF as an end of a standard optical fibre enables splicing at standard conditions yielding low splicing losses and high strength. In particular, this enables splicing at conditions using heat treatment parameters such as heat exposure time and temperature that are known from splicing technology of standard optical fibres. Naturally, PCFs according to the present invention may be spliced to a standard optical fibre, as well as to other PCFs according to the present invention with low losses and/or high strength.

In the majority of the fibre length (exemplified by the position 71, where the PCF has a cross-section with non-collapsed inner cladding features), the incurred index-step for the microstructured cladding (the index difference between n1 and n2) is significantly smaller than the effective index difference between the core region and the inner cladding region. Hence, the index difference between $n_1$ and $n_2$ will only slightly—and preferably negligibly—change the optical properties of the PCF, as compared to a PCF with uniform cladding background refractive index. Intuitively, the fibre may be seen to have incorporated two waveguiding profiles; a strong profile in the case of non-collapsed holes (position 71) that confines light tightly in a small core, and a weaker profile in the case of the collapsed holes (position 70) that confines light in a larger core. Alternatively worded, the PCF may be seen to have "embossed" the refractive index profile of a standard fibre into the solid parts of the PCF. In the case where the holes or voids are collapsed, the "embossed" index profile stands out and the PCF is thereby brought to become similar and compatible with standard optical non-microstructured fibres. Since the "embossed" profile (responsible for the waveguiding at position 70) is weaker than the microstructured profile (responsible for the waveguiding at position 71), the fibre may be kept single mode at position 70 even though the core size here is increased as compared to position 71. In fact, a PCF may be made that is in theory multi-mode at position 71, but single mode at position 70. This is possible due to a strong decrease of the effective refractive index by air holes or voids in the inner cladding, as compared to index changes that may be obtained using traditional silica-doping techniques.

As "embossed" profile, the present invention covers all known refractive index profiles from standard optical fibre technology. Hence, any such refractive index profiles in combination with any known hole or void structure or design of PCFs are covered by the present invention for as long as the inner cladding features have been collapsed at least one fibre end. This provides compatibility in terms of low losses and/or high mechanical strength of splicings between PCFs and various types of standard optical fibres or other PCFs.

The ideas and methods disclosed in the present invention are especially useful for small core fibers with small mode field areas. The collapsed index-guiding fiber end 70 is preferably single mode. Examples of small core PCFs are highly nonlinear fibers and dispersion compensating fibers. Hence, the present invention provides technical advantages in terms of reduced splice loss and/or improved splice strength for such fibres and applications using such fibres. Hence, the present invention also covers use of the here-disclosed spliceable optical fibres for various applications, including nonlinear fibres and dispersion compensating fibres. Specifically, the use of a spliceable optical fibre in connection with a coupling to another optical fibre or component is covered.

Preferred embodiments of the present invention covers PCFs realized in silica technology with air holes or voids. In preferred embodiments, the core and inner cladding background material comprises Ge-doped silica (optionally various other dopants, such as Al, La, and/or various rare earth elements (e.g. Nd, Tb, Er, Yb) could be included), and the outer cladding background material comprises pure silica. In another preferred embodiment, the core and the inner cladding background material comprises pure silica and the outer cladding background material comprises silica doped with index decreasing material, such a Fluorine and/or Boron. In preferred embodiments, the core has a relatively small size, such as a core diameter ($2r_{PCF}$) of less than 3.0 µm, such as less than 2.0 µm. In order to reduce leakage losses of PCFs, it is often preferred that more than 5, such as more than 7 rings or layers or periods of holes or voids surround the core (this number being taken as the total number of rings in the inner and outer cladding region). The fabrication of photonic crystal fibres is described in Chapter 4 (p. 115-130) of [Bjarklev et al.]).

For a spliceable optical fibre according to the present invention, it should be clear that the parameter $r'_{solid}$ will be smaller than $r_{solid}$ (due to the collapse of the inner holes or voids). Hence, in order to obtain a desired core size at the collapsed end (a given $r'_{solid}$), $r_{solid}$ should be designed larger than the desired core size. The exact dimensioning of $r_{solid}$, depends on the various features of the PCF, most importantly the filling fraction of the inner cladding region (this filling fraction being determined by the size and arrangement of the inner cladding features).

Figure 8:
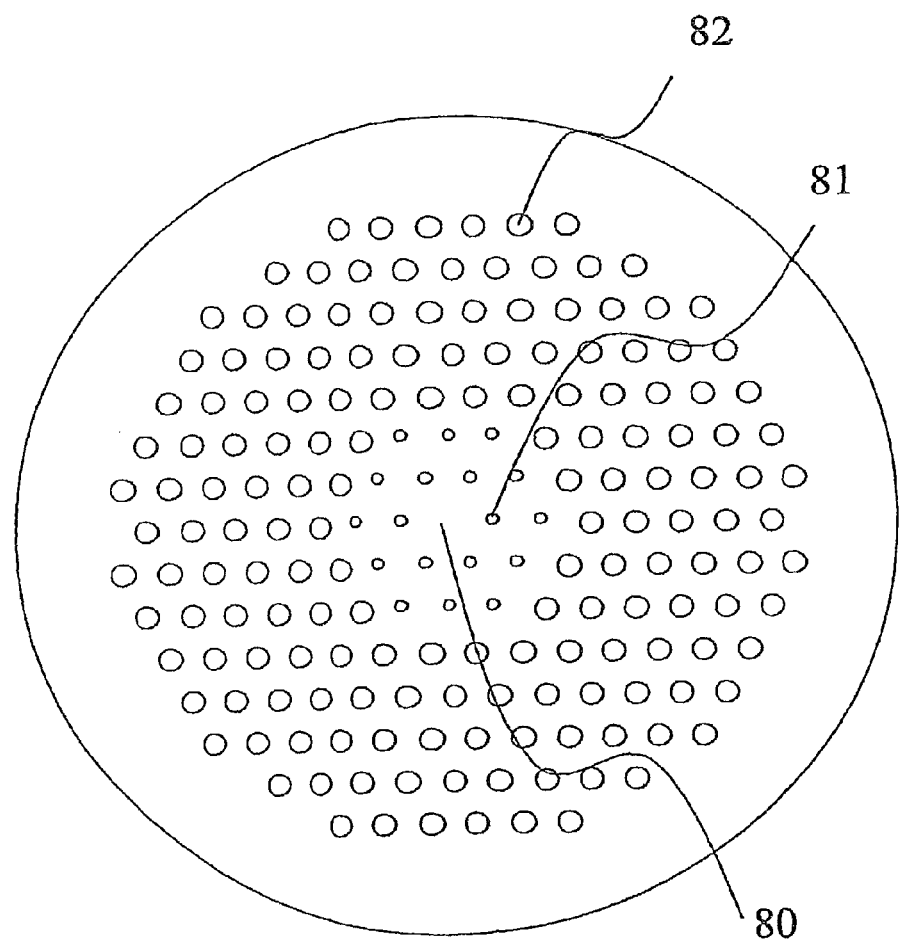
FIG. 8 shows a schematic example of another fibre according to the present invention.
Figure 9:
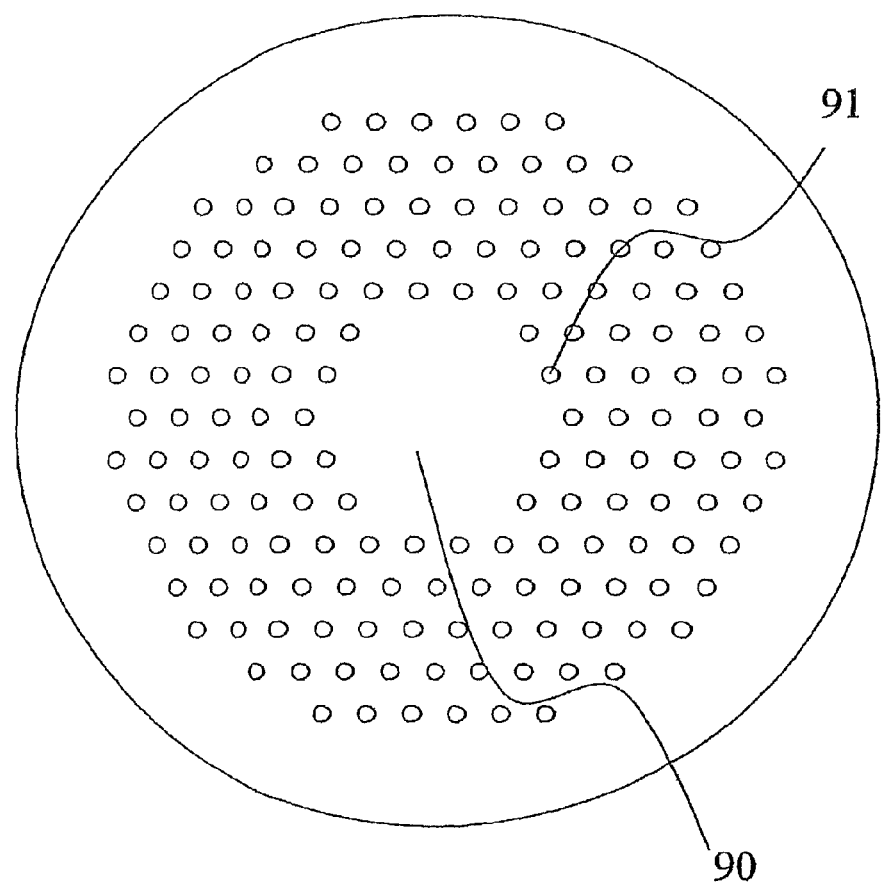
FIG. 9 shows a schematic example of an end of another fibre according to the present invention.

The ideas of the present inventors may also be utilized in single material PCFs. An example is shown in FIG. 8 where the spliceable optical PCF comprises features of at least two different sizes as illustrated by a cross-section of the fibre. Surrounding the core 80, there is placed—in radial direction—a number of inner cladding features 81 of size (here diameter) $d_1$, and further away from the core a number of outer cladding features 82 of size (here diameter) $d_2$. In a first cross-section at a first longitudinal position at least 1 µm away from the end facet or spliced end, or end face, the fibre is characterized by the cross sectional dimensions of the inner and outer cladding features: $d_1$, $d_2 > 0$ and $d_2 > d_1$. In an embodiment of the invention, at least one end of the fibre, the fibre is further characterized by the inner cladding features being collapsed and the outer cladding features being non-collapsed, such that $d_1' = 0$ and $d_2' > d_1'$ ($d_1'$, $d_2'$ being the modified dimensions of the inner and outer cladding features, respectively, after the collapse). FIG. 9 shows schematically a cross section of the collapsed fibre at the end or the spliced end. The collapse of the inner cladding features causes the outer cladding features 91 to provide the confinement of light to the (enlarged) core region 90. In this manner, it is obtained that the optical fibre has a small MFD over the majority of its length, and at an end or a spliced end that the MFD is expanded. By dimensioning of the inner and the outer cladding features, the MFD over the un-collapsed part of the length of the fibre and at the collapsed part at the end or the spliced end may be accurately controlled. Hence, also by this alternative embodiment of the present invention, it becomes possible to provide a PCF with a small MFD (for example a MFD of less than 3.0 µm) that is spliced with low loss to a standard non-microstructured fibre (for example with a MFD of more than 4.0 µm). The low loss is obtained by matching the MFD of the PCF at its end or spliced end by collapsing inner cladding features, e.g. in the form of holes or voids. It should be clear that the same technical advantages in terms of mode matching at the fibre splicing as discussed for the fibres in FIGS. 1 to 7 are obtained for the fibre in FIGS. 8 and 9. However, the technical advantages in the case of FIGS. 8 and 9 are obtained without the use of an index difference between the inner and outer cladding background material, but with the use of differently sized inner and outer cladding features and non-collapsed outer cladding features at the fibre end or spliced end.

The collapse of the inner cladding features (typically holes or voids) for all embodiments of the present invention may be obtained by applying a heat treatment to the fibre end, or other relevant part of the spliceable optical fibre. In the case of larger outer cladding features, the smaller size of the inner cladding holes or voids compared to the outer cladding holes or voids results in a larger surface tension for the innermost holes or voids. This larger surface tension will cause the innermost holes or voids to collapse at a lower temperature and/or after a shorter time of heat treatment. The outer cladding features may also partly collapse—as indicated in FIG. 9, where the outer cladding features 91 are reduced in size as compared to their original size 82 in FIG. 8.

Commercially available splicing equipment, such as for example Vytran FFS2000 (from Vytran Corporation of Morganville, N.J. 07751 USA), allows control of parameters such as heating time and amount of heat to allow fabrication of the fibres' end facet or spliced ends according to the various preferred embodiments of the present invention. For the embodiments where all holes or voids are collapsed at the fibre end, it should be clear that the procedure for collapsing holes or voids is even more simple than in the case described above with collapsed inner cladding features and non-collapsed outer cladding features. To a person skilled in the art of operating splicing equipment, it is possible to provide a sufficiently long heat treatment for all holes or voids to collapse at the fibre end or during fibre splicing. Optionally, a less-than-atmospheric pressure may be applied to the holes or voids of the fibre to facilitate their collapse. Especially, in the case of a fibre end with all holes or voids being collapsed, such as the embodiments comprising an index difference between the inner and outer cladding background material (cf. e.g. FIGS. 1-7), splicing of the microstructured fibre to other fibres, typically standard (solid, non-microstructured) fibre may be performed using standard splicing techniques that provides high strength. The collapse and splicing to standard fibre may either be performed in a single step or in two or more steps using the Vytran FFS2000 equipment.

Figure 10:
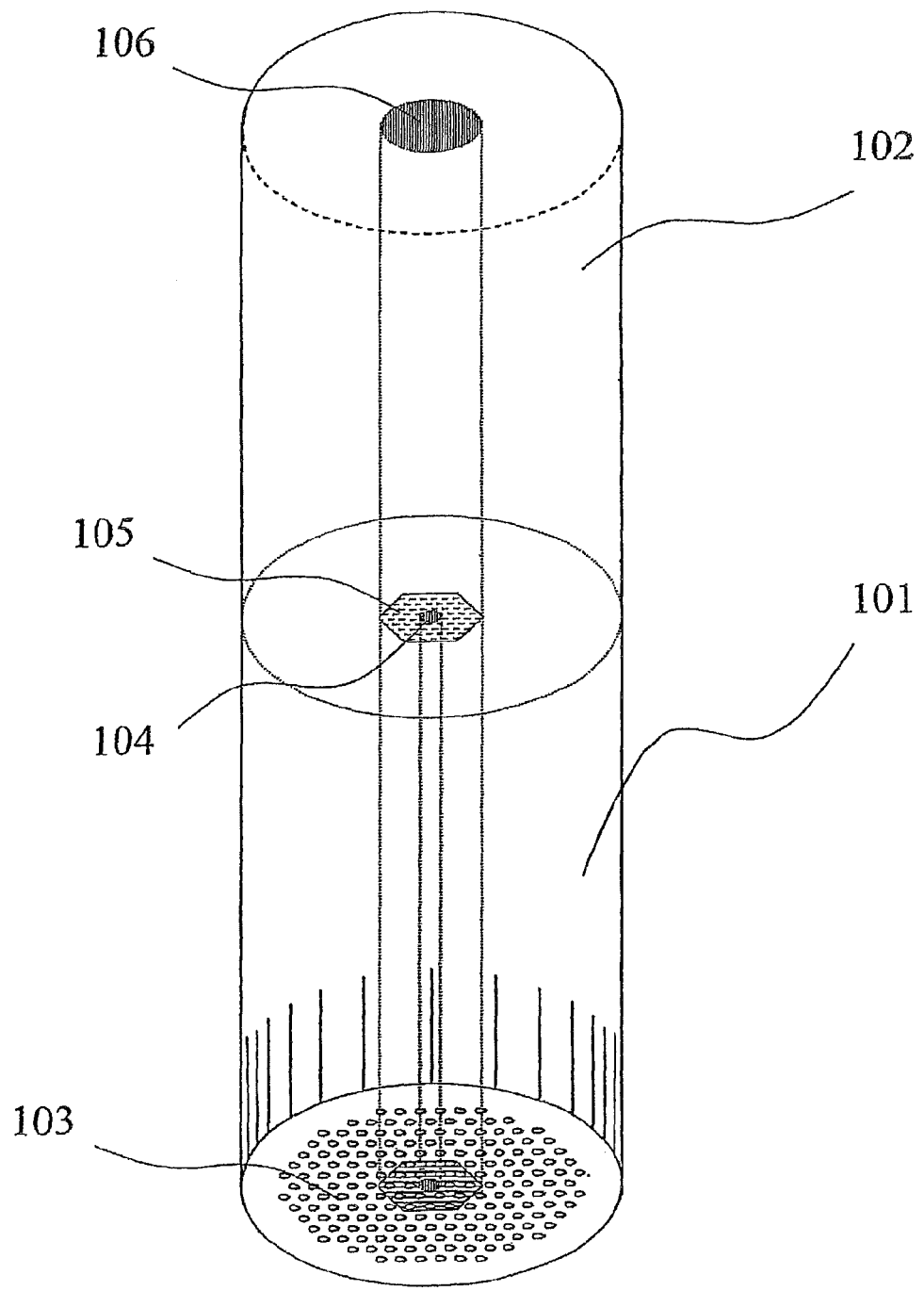
FIG. 10 shows a schematic example of an optical fibre splicing according to a preferred embodiment of the present invention.

FIG. 10 shows an example of use of a microstructured optical fibre according to a preferred embodiment of the present invention. The microstructured spliceable optical fibre 101 is spliced to a standard (solid) optical fibre 102. The microstructured optical fibre is characterized by a core 104 with a doping profile and a doped profile in an inner cladding 105. The microstructured spliceable optical fibre 101 further comprises a number of holes or voids over a given length— exemplified at the position 103. The standard optical fibre 102 comprises a doped profile 106 to provide given optical properties of the fibre—for example single mode operation at a given wavelength. The inner cladding region profile 105 may be adapted to the standard fibre profile 106 such that there is a high overlap between a mode guided by the inner cladding region profile 105 and the standard fibre profile 106—such as a mode overlap of more than 80%. The core and inner cladding profiles 104 and 105 in combination may also be adapted or designed such that there is a mode overlap of more than 80% to a mode guided by the standard fibre profile 106. The two fibres may be spliced together by applying a heat-treatment to both fibre ends such that the holes or voids of the microstructured optical fibre collapse and the glass in both fibres becomes soft. By pushing the two fibres together they may be fused together. The heat treatment and the fusing may be performed using the afore-mentioned Vytran splicing equipment. This equipment also allows to push the two fibre against each other in a controlled manner. This may for example be utilized to provide a substantially uniform outer diameter of the microstructured optical fibre along its length (including at the spliced end where the holes have been collapsed). Hence, an optical fibre splicing or splice may be obtained between a microstructured optical fibre and a standard optical fibre, where tapering is avoided. Since tapering provides increased risk of mechanical breakage due to smaller outer fibre diameter, it is an advantage of the here disclosed method and use of microstructured optical fibres, that substantially uniform outer fibre diameter may be obtained across a splicing.

Figure 11:
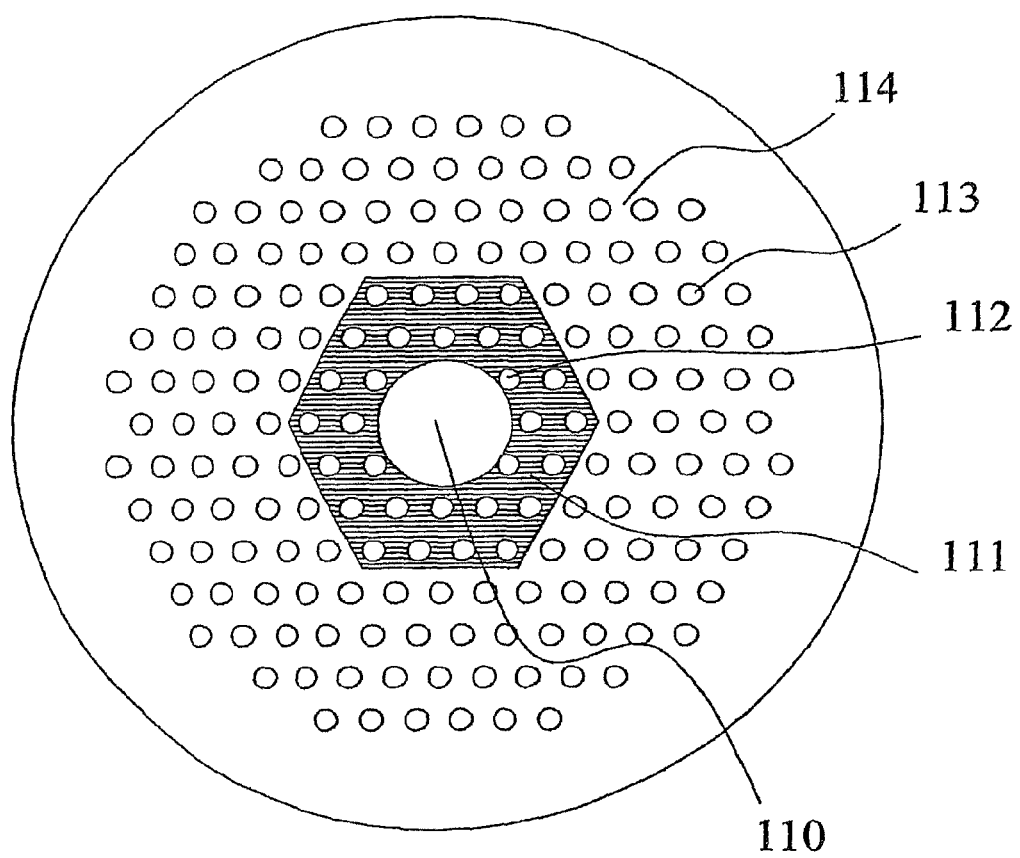
FIG. 11 shows a schematic example of an optical fibre according to a preferred embodiment of the present invention. The optical fibre is a photonic bandgap fibre.

FIG. 11 shows a schematic example of the cross-section of yet another fibre according to the present invention. The optical fibre may guide light by photonic bandgap effects and is characterized by a low-index core region and a periodic cladding region obtained by the use of periodically placed voids or holes in the inner and outer cladding region. The fibre is characterized by a hollow core region 110, and an inner cladding region comprising an inner background material 111 with refractive index $n_1$ and inner cladding features 112 with diameter $d_1$, and an outer cladding region comprising an outer background material 114 with refractive index $n_2$ and outer cladding features 113 with diameter $d_2$, and $n_1$ is larger than $n_2$.

Figure 12:
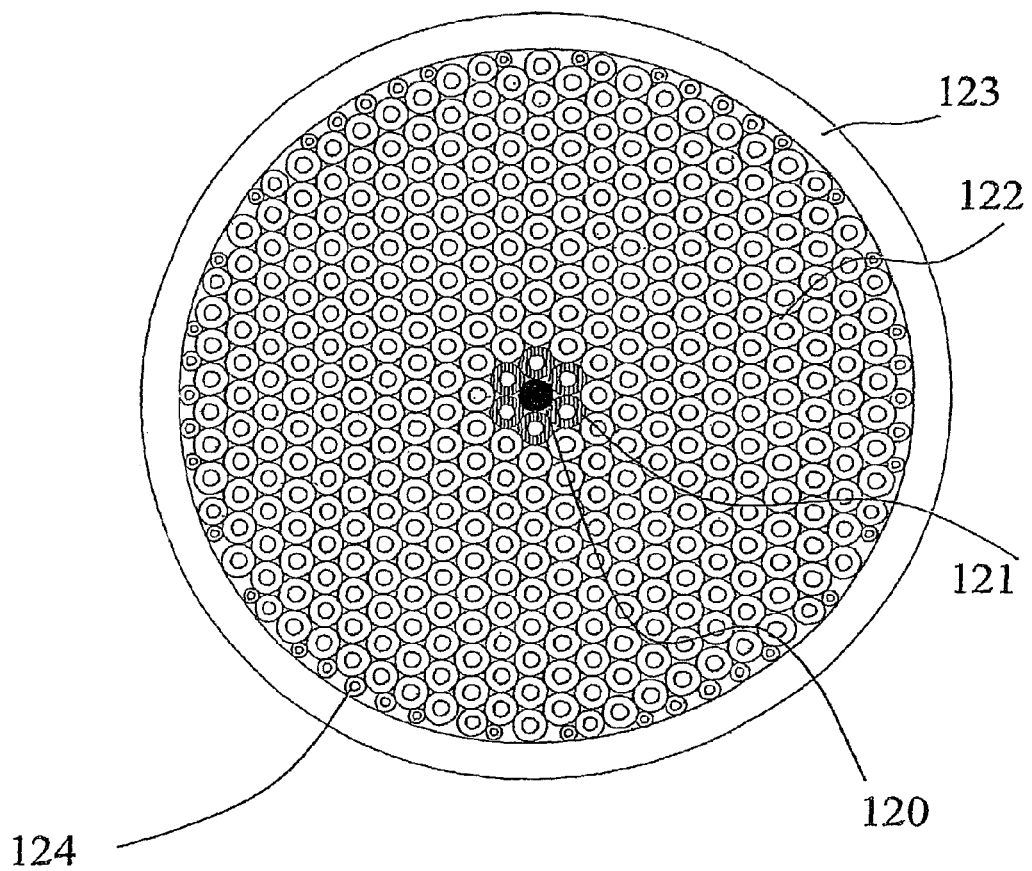
FIG. 12 shows a schematic example of an optical fibre preform according to a preferred embodiment of the present invention.

FIG. 12 shows a schematic example of a cross section of a preform for fabricating a spliceable optical fibre according to various preferred embodiments of the present invention (cf. e.g. FIG. 1). A preform may typically comprise longitudinal tubular or rod-formed elements stacked together in a manner reflecting the cross section of the fibre to be drawn from it, cf. e.g. [Bjarklev et al.], chapter 4.2, p. 116-119. The preform comprises a core element 120 with a refractive index $n_{core}$, a number of inner cladding elements 121 comprising material with refractive index $n_1$, and a number of outer cladding elements 122 comprising material with refractive index $n_2$. In a preferred embodiment $n_1$ is larger than $n_2$. In order to tune various properties of the final fibre, it is preferred that there is a flexibility in the tuning of $n_{core}$. Since $n_{core}$ is determined by one, or more, individual elements 120, $n_{core}$ may be chosen to be similar, smaller than or larger than $n_1$.

In preferred embodiments, the preform is made using silica based glasses, such that certain parts of the preform elements are realized using pure silica and other parts are realized using doped silica. Various dopants may be used to provide a given refractive index level or profile as well as active dopants may be used to provide fibre for e.g. amplifying or lasing applications.

In order to stabilize the drawing of the preform, it is often preferred to use an overcladding tube 123 and optionally various stuffing or buffering elements 124 to further fill the overcladding tube.

Preferably, the number of inner cladding elements 121 is in the range of 6 to 18 in order to obtain one or two rings of inner cladding features around the core region in the final fibre.

The preform may be drawn into optical fibre using one or more steps—as would be known to a person skilled in the art of producing PCFs, cf. e.g [Bjarklev et al.], chapter 4.3, p. 119-123. The preform may e.g. in an intermediate step be drawn to a cane with an outer diameter in the range between 1 and 20 mm. The holes (or selected holes) in and between the tubes or rods of the preform may be collapsed or remain non-collapsed by controlling the pressure, by sealing an end or parts of an end of the preform and by adjustment of drawing parameters such as temperature, drawing speed, etc. A spliceable fibre according to the invention may in a later step be drawn from the cane. Again, in order to ensure the non-collapse of the holes or voids in the inner and/or outer cladding elements during drawing these may be provided with an over pressure. Similarly the collapse may be facilitated by evacuating the holes or voids in question.

FIG. 13.a shows a schematic example of a cross section of an optical fibre preform according to a preferred embodiment of the present invention with a solid core element 130 and tubular inner 131 and outer 132 cladding elements having identical refractive indices but different inner diameters (cf. e.g. the fibre cross section of FIG. 8). The inner diameter 135 of the inner cladding elements is smaller than the inner diameter 136 of the outer cladding elements. Buffering elements 134 in the form of tubular elements are added along the periphery of the preform to fill out possible empty space in the overcladding tube 133. In an embodiment of the invention, the same material (e.g. silica) is used for core, cladding and buffering elements.

FIG. 13.b shows a schematic example of a cross section of an optical fibre preform according to a preferred embodiment of the present invention with a tubular core element 136 and tubular inner 131 and outer 132 cladding elements having different refractive indices and different inner diameters. The inner diameter 135 of the inner cladding elements 131 is smaller than the inner diameter 136 of the outer cladding elements 132. The inner diameter 137 of the core tube may advantageously be increase compared to the schematic illustration of FIG. 13.b (by starting the stacking of the preform with a central tube having a larger outer (and inner diameter)). A preform of this structure may be used to draw a hollow core spliceable optical fibre according to the invention and as illustrated in FIG. 11.

Figure 14:
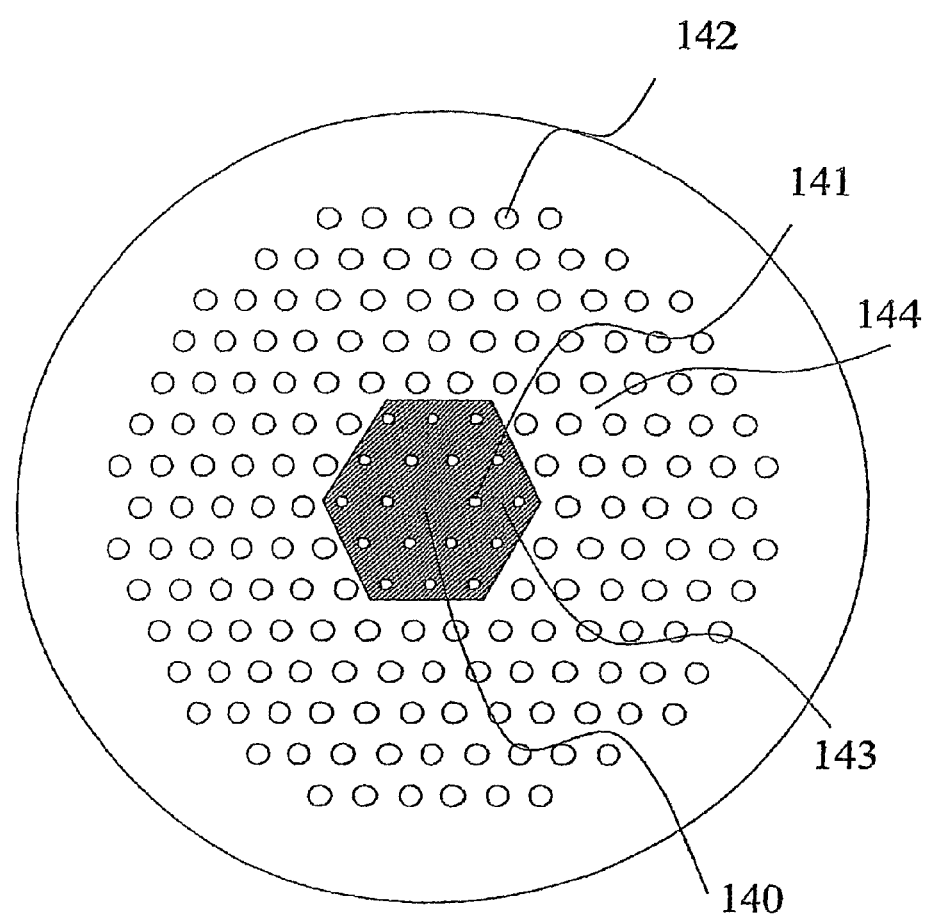
FIG. 14 shows a schematic example of a spliceable optical fibre according to the present invention, the inner and outer cladding regions having different refractive indices and voids of different inner diameters.

FIG. 14 shows a schematic example of an un-collapsed cross section of a spliceable optical fibre according to the present invention, the fibre comprising a core region 140, inner 143 and outer 144 cladding regions, the core and the background material of the inner cladding region having identical refractive indices ($n_{core} \sim n_1$), and the background material of the inner and outer cladding regions having different refractive indices ($n_1 \neq n_2$), both comprising voids of different inner diameter. The inner cladding voids 141 have a diameter $d_1$ smaller than the diameter $d_2$ of the outer cladding voids 142.

Figure 15:
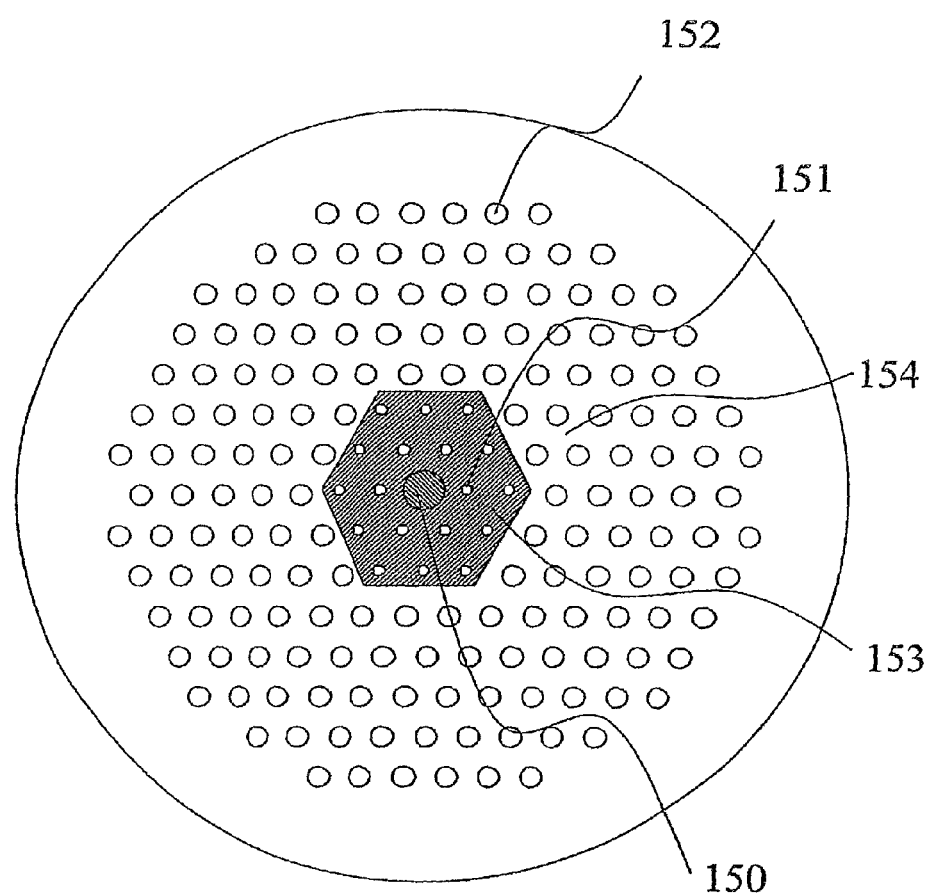
FIG. 15 shows a schematic example of a spliceable optical fibre according to the present invention, the core and the background material of the inner and outer cladding regions having different refractive indices, the cladding regions comprising voids of different inner diameters.

FIG. 15 shows a schematic example of an un-collapsed cross section of a spliceable optical fibre according to the present invention, the fibre comprising a core region 150, inner 153 and outer 154 cladding regions, the core 150 and the background material 153 of the inner cladding region having different refractive indices ($n_{core} \neq n_1$), and the background material of the inner and outer cladding regions having different refractive indices ($n_1$ $n_2$), both comprising voids of different inner diameter. The inner cladding voids 151 have a diameter $d_1$ smaller than the diameter $d_2$ of the outer cladding voids 152.

The embodiments of FIGS. 15 and 16 may be collapsed over a section of the fibre (e.g. including an end) as discussed in connection with FIGS. 8, 9 and 10.

FIG. 16 is a schematic illustration of a method of coupling a spliceable photonic crystal fibre 160 to a non-micro-structured optical fibre 161, FIG. 16.a showing two sections of optical fibre to be joined at their ends initially axially aligned and with their end faces 162, 163 positioned at a distance from each other, FIG. 16.b illustrating a situation where the two end faces are positioned close to each other and subject to a heat source 165 over a certain distance 166, 167 of each fibre including their end faces, the end faces possibly being displaced towards each other during heating as indicated by arrows A. In FIG. 16.b the heat source 165 is schematically indicated as comprising a flame being moved over the sections 166 and 167 of the two optical fibres 160, 161 to be spliced. The heat source 165 may, however, preferably be implemented as a heating element (e.g. an electrical element) surrounding the whole or a part of sections 166 167 of the two fibres to be spliced (as in a standard fusion splicer). FIG. 16.c schematically illustrates the resulting spliced fibre combination 1600 wherein the voids 1601 of the inner cladding region 1603 have been collapsed (and the diameter of the voids 1602 of the outer cladding region diminished) over the section 166 having been subject to a heat treatment.

In an embodiment of the invention, an end of the spliceable optical fibre is 'pre-processed' in that a section of the fibre near the end but far enough away to be clear of any significant in-diffusion of impurities is heat treated and all voids in a given cross section is collapsed thereby effectively sealing the fibre in that cross section which may subsequently be subject to cleavage and splicing to an appropriate other optical fibre or component. In a preferred embodiment, a cleavage of the sealed fibre is performed at a location where all voids are un-collapsed (but within the sealed and thus uncontaminated part) in the same operation or immediately before the splicing process with the other fibre.

By properly adjusting the materials and refractive indices (including the effect of possible dopants) of the spliceable optical fibre, the pattern (number, mutual position), form and dimensions of the cladding features (in the inner as well as optionally in the outer cladding region), the length of the section 166 over which the spliceable optical fibre 160 is heat treated, it is possible to adapt the mode size at the end face 1605 of the collapsed part of the spliceable optical fibre. This ensures that an appropriate mode overlap may be designed into the spliceable optical fibre for practically any standard non-microstructured fibre or PCF or optical component (e.g. planar waveguide). In the embodiment shown in FIG. 16, the spliceable optical fibre is spliced to a standard non-microstructured fibre. In this case the mode field at the end face 1605 of the collapsed section of the spliceable optical fibre 160 (cf. e.g. $2*r'_{solid}$ of FIG. 5) is preferably adapted to the cross sectional size of the core region 1610 of the standard non-microstructured fibre 161 (cf. also FIG. 10). In an embodiment of the invention, the radial difference in mode size at the interface 1605 is smaller than 1 μm, such as smaller than 0.5 μm. In an embodiment of the invention, the mode overlap at the interface 1605 is larger than 60%, such as larger than 80%, such as larger than 90%.

In an embodiment of the invention, the core region 1609 of the spliceable optical fibre 160 according to the invention comprises dopant materials to regulate the refractive index of the region. In this case, the mode size of the electromagnetic field at the end face 162 may be increased by thermal expansion. The thermal expansion may e.g. be performed in a standard splicer by a local heat treatment that has the effect of forcing the dopant atoms/ions of the core to diffuse into the inner cladding region 1603, thereby expanding the mode over a corresponding length of the fibre.

Figure 17A:
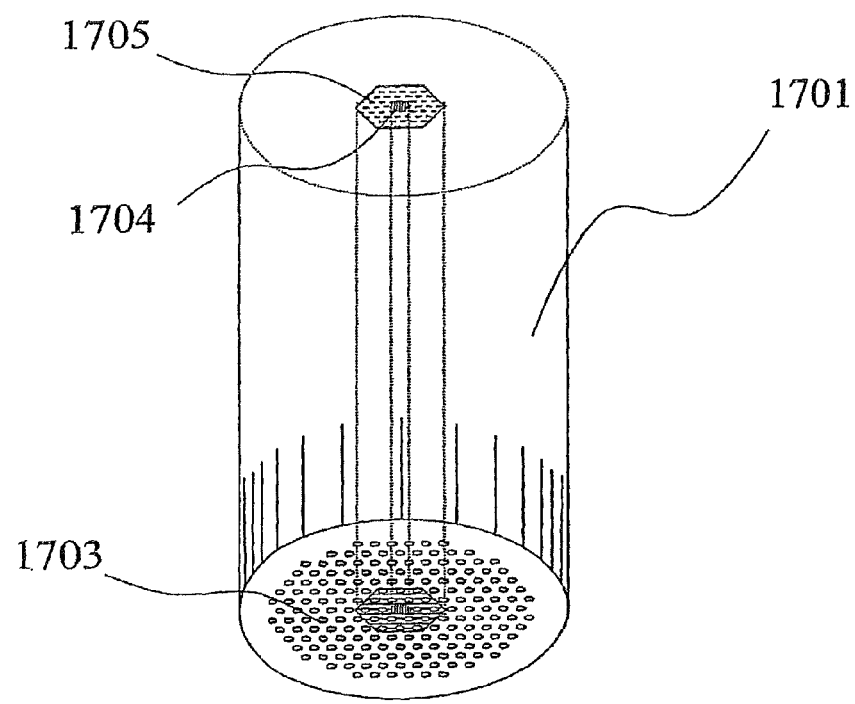
FIG. 17 shows an end section of a spliceable optical fibre adapted for being used with an optical connector, FIG. 17.a showing the end section in a cross sectional perspective view and FIG. 17.b schematically showing the connector positioned at an end of the fibre.
Figure 17B:
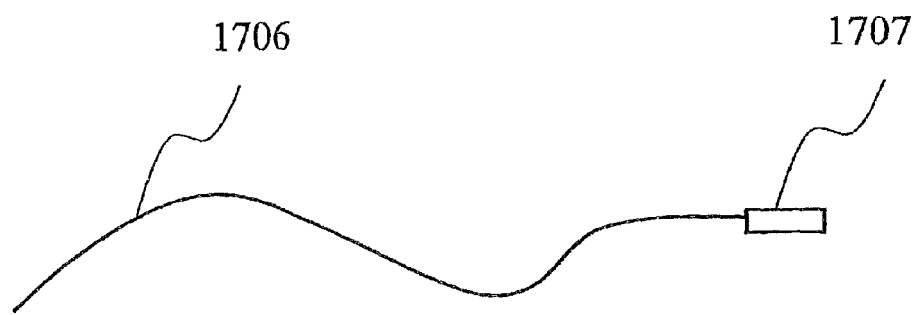

FIG. 17 shows an end section 1701 of a spliceable optical fibre 1706 adapted for being used with an optical connector 1707, FIG. 17.*a* showing the end section 1701 in a cross sectional perspective view with end face 1703 and FIG. 17.*b* schematically showing the connector 1707 positioned at an end of the fibre 1706.

The connector can be of various types, including an SMA 905, FCPC, SC, etc. Fibres according to the invention can be cabled by conventional means for standard non-microstructured fibres. The collapsed end section 1701 can be placed in ferrule (optionally the connector 1707 can indicate a ferrule). Optionally the ferrule can further comprise a lens (e.g. an aspherical lens), thereby forming a collimator.

FIG. 18 shows a length of a spliceable optical fibre 180 according to the invention (e.g. a spliceable optical fibre having a cross section as shown in FIG. 15), which is subjected to a heat treatment (as described in connection with FIG. 16) over a section 181 of its length, possibly but net necessarily including an end of the fibre. In FIG. 18 an embodiment where the to-be-heated section is located at a distance from an end of the fibre is illustrated. As discussed above, the heat treatment collapses the collapsible inner cladding voids at least over a part 182 of the to-be-heated section of the fibre. In a preferred embodiment, all voids or holes in said spliceable optical fibre is collapsed and/or sealed by the heat treatment. This has the advantage that subsequent in-diffusion of impurities into the 'exposed'/open voids or holes is prevented, when—in a subsequent step—the fibre is cleaved at a position 183 of the collapsed section. See FIG. 18.*c*.

While the invention has been particularly shown and described with reference to particular embodiments, it will be understood by those skilled in the art that various changes in form and details may be made therein without departing from the spirit and scope of the invention, and it is intended that such changes come within the scope of the following claims.

The invention claimed is:

1. A spliceable optical fiber for transmission of light in its longitudinal direction, the optical fiber having a cross section perpendicular to the longitudinal direction, said optical fiber comprising in the cross section:
    (a) a core region for guiding said light; and
    (b) a microstructured cladding region, said cladding region surrounding said core region and comprising:
    (b1) an inner cladding region with inner cladding features arranged in an inner cladding background material with a refractive index n1, said inner cladding features comprising thermally collapsible holes or voids extending in the longitudinal direction of the fiber over substantially an entirety of the fiber, wherein the inner cladding features substantially confine the guided light within the core; and
    b2) an outer cladding region surrounding said inner cladding region and having an outer cladding background material with a refractive index n2 less than n1;
    said spliceable optical fiber having a collapsed optical fiber end wherein said inner thermally collapsible holes or voids are collapsed via heating of said end so that an expanded core is provided at said collapsed optical fiber end where a guided mode at the at least one fiber end is substantially confined by the difference between n1 and n2.

2. The fiber of claim 1 wherein said core region comprises a material with a refractive index $n_{core}$, and $n_{core}$ is equal to $n_1$.

3. The fiber of claim 1 wherein said core region comprises a material with a refractive index $n_{core}$, and $n_{core}$ is larger than $n_1$.

4. The fiber of claim 1 wherein said core region comprises a material with a refractive index $n_{core}$, and $n_{core}$ is smaller than $n_1$.

5. The fiber of claim 1 wherein said collapsing of said thermally collapsible holes or voids being gradual.

6. The fiber of claim 1 wherein said collapsing of said thermally collapsible holes or voids being abrupt.

7. The fiber of claim 1 wherein said thermally collapsing holes or voids at said fiber end are wholly.

8. The fiber of claim 1 wherein said heating is provided by a fusion splicer.

9. The fiber of claim 1 wherein the fiber is coupled to an optical component for transmission of light in its longitudinal direction to said optical component, where said coupling comprises fusing of said at least one collapsed spliceable optical fiber end and said optical component.

10. The fiber of claim 1 wherein said optical component is a second optical fiber, an optical connector, or a combination thereof.

11. The fiber of claim 10 wherein said second optical fiber is a photonic crystal fiber.

12. The fiber of claim 10 wherein said second optical fiber is a non-microstructured optical fiber.

13. The fiber of claim 1 wherein said collapsing of said thermally collapsible holes or voids is controlled by applying less-than-atmospheric pressure to the holes or voids of the optical fiber to facilitate their collapse.

14. The fiber of claim 1 wherein said inner cladding background material comprises a doped silica material.

15. The fiber of claim 14 wherein said doped silica material of said inner cladding comprises at least one dopant selected from the group of Ge, Al, La, Nd, Tb, Er and Yb.

16. The fiber of claim 1 wherein said core comprises a background material comprising a doped silica material.

17. The fiber of claim 16 wherein said doped silica material of said core comprises at least one dopant selected from the group of Ge, Al, La, Nd, Tb, Er and Yb.

18. The fiber of claim 1 wherein said optical fiber has at least one position away from said fiber end where a guided mode at a given wavelength, $\lambda$, is substantially confined to the core region by the presence of inner cladding features.

19. The fiber of claim 18 wherein $\lambda$ is in the range from 0.4 µm to 2.0 µm.

20. The fiber of claim 19 wherein said mode is expanded as said collapsed fiber end.

21. The fiber of claim 1 wherein said inner cladding features have a size of d1 and said outer cladding region comprises outer cladding features of size d2.

22. The fiber claim 21 wherein d2 is larger than d1.

23. The fiber of claim 22 wherein n1 equals n2.

24. The fiber of claim 22 wherein n1 and n2 are different by less than 2%.

25. The fiber of claim 1 wherein the fiber at its collapsed optical fiber end is coupled to an optical component.

* * * * *